United States Patent
Cyr et al.

(10) Patent No.: US 10,727,940 B2
(45) Date of Patent: Jul. 28, 2020

(54) NOISE-FREE MEASUREMENT OF THE SPECTRAL SHAPE OF A MODULATED SIGNAL USING SPECTRAL CORRELATION

(71) Applicant: EXFO Inc., Quebec (CA)

(72) Inventors: Normand Cyr, Quebec (CA); Gang He, Quebec (CA); Bernard Ruchet, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 16/445,992

(22) Filed: Jun. 19, 2019

(65) Prior Publication Data

US 2019/0305845 A1 Oct. 3, 2019

Related U.S. Application Data

(63) Continuation of application No. PCT/IB2018/052423, filed on Apr. 6, 2018.

(Continued)

(51) Int. Cl.
*H04B 10/00* (2013.01)
*H04B 10/079* (2013.01)

(52) U.S. Cl.
CPC . *H04B 10/07953* (2013.01); *H04B 10/07955* (2013.01)

(58) Field of Classification Search
CPC ........ H04B 10/07953; H04B 10/07955; H04B 10/0775; H04B 10/07951; H04B 10/0779;

(Continued)

(56) References Cited

U.S. PATENT DOCUMENTS 6,256,103 B1  7/2001 Sorin et al.
6,515,276 B2  2/2003 Baney et al.
(Continued)

OTHER PUBLICATIONS

Moench et al., Measurement of Optical Signal-to-Noise-Ratio in Coherent Systems using Polarization Multiplexed Transmission, Optical Fiber Communication Conference 2017 Technical Digest, Th2A.42.pdf, 2017, 3 pages.

*Primary Examiner* — Hibret A Woldekidan
(74) *Attorney, Agent, or Firm* — Helene Chotard

(57) ABSTRACT

Method and systems for characterizing an optical signal propagating along a communication link are disclosed. The signal includes a data-carrying signal contribution, modulated at a symbol frequency, and a noise contribution. The method includes measuring an optical power spectrum of the signal, which includes a data-carrying signal spectrum component and a noise spectrum component. The method also includes determining a measured spectral correlation function within pairs of spectral components of the signal as a function of center frequency of the pairs, the spectral components in each pair being spectrally separated from each other by the symbol frequency. The method further includes obtaining a solution for the data-carrying signal spectrum component based on the measured optical power spectrum, such that a calculated spectral correlation function based on the solution matches the measured spectral correlation function. In some embodiments, the spectral correlation function is measured as a low-frequency beatnote amplitude function.

24 Claims, 15 Drawing Sheets

Related U.S. Application Data

(60) Provisional application No. 62/490,113, filed on Apr. 26, 2017.

(58) Field of Classification Search
CPC .... H04B 10/0795; H04B 10/60; H04B 10/61; H04B 10/6165; H04B 10/505; H04B 10/5161; H04B 10/548
USPC .................... 398/25, 26, 28, 34, 35, 38, 202
See application file for complete search history.

(56) References Cited

U.S. PATENT DOCUMENTS

| | | | | |
|---|---|---|---|---|
| 6,898,001 B2* | 5/2005 | Ishihara | ............ | H04B 10/0731 359/337 |
| 9,008,508 B2* | 4/2015 | Liu | .................... | H04B 10/0775 398/25 |
| 9,112,604 B2* | 8/2015 | Gariepy | ........... | H04B 10/07953 |
| 9,413,455 B2* | 8/2016 | Oda | ................. | H04B 10/07953 |
| 9,438,336 B2* | 9/2016 | He | .................... | H04B 10/07953 |
| 9,596,027 B2* | 3/2017 | He | .................... | H04B 10/07953 |
| 9,825,698 B2 | 11/2017 | Heismann | | |
| 9,954,610 B2* | 4/2018 | He | .................... | H04B 10/07953 |
| 10,128,960 B2* | 11/2018 | Okabe | ................. | H04B 10/0795 |
| 10,128,975 B2* | 11/2018 | He | .................... | H04B 10/07953 |
| 10,348,412 B1* | 7/2019 | Xue | .................... | H04B 10/548 |
| 10,567,077 B2* | 2/2020 | Oyama | ........... | H04B 10/07955 |
| 2014/0328586 A1 | 11/2014 | He et al. | | |
| 2016/0072579 A1* | 3/2016 | Schroeder | ........ | H04B 10/07953 398/26 |
| 2016/0127074 A1 | 5/2016 | He et al. | | |
| 2016/0164599 A1* | 6/2016 | Heismann | ........ | H04B 10/07955 398/26 |
| 2018/0034550 A1* | 2/2018 | Rakich | ...................... | G02F 1/11 |
| 2019/0187051 A1* | 6/2019 | Green | .................... | G01N 21/45 |

* cited by examiner

NOISE-FREE MEASUREMENT OF THE SPECTRAL SHAPE OF A MODULATED SIGNAL USING SPECTRAL CORRELATION

RELATED PATENT APPLICATION

The present application is a continuation of International Application No. PCT/IB2018/052423 filed Apr. 6, 2018, which claims priority from U.S. Provisional Patent Application No. 62/490,113 filed on Apr. 26, 2017, the specifications of which are incorporated herein by reference in their entirety.

TECHNICAL FIELD

The technical field generally relates to optical signal characterization in telecommunication applications, and more particularly, to a method and apparatus for spectrally characterizing optical signals propagating along an optical communication link, for example to discriminate data-carrying signal contributions from noise contributions and/or to perform optical signal-to-noise ratio (OSNR) measurements.

BACKGROUND

The performance of long-haul fiber-optic communication systems depends largely on the optical signal-to-noise ratio (OSNR). The OSNR is a conventional measurable characteristic of the quality of a signal carried by an optical telecommunication link. The dominant noise component in an optical communication link is typically unpolarized amplified spontaneous emission (ASE) noise. ASE noise is a spectrally broadband noise source contributed by the optical amplifiers in the link. In practice, the OSNR must therefore be measured somewhere along the link, for example at the receiver end. Current state-of-the-art systems achieve high spectral efficiency using both sophisticated modulation schemes and polarization multiplexing (PM). However, traditional OSNR measurement techniques fail in cases where both densely-packed channels and PM signals are combined. That is, the ASE noise spectrum generally cannot be measured outside of the signal-spectrum bandwidth because the channels are too closely spaced. Meanwhile, in-band measurement methods of the polarization-nulling type, which rely on the fact that the signal is 100% polarized whereas ASE is unpolarized, also suffer from drawbacks because the overall PM signal is also unpolarized.

A method of measuring noise level on PM signals using an acquired optical spectrum trace of the signal was proposed in co-owned U.S. Pat. No. 9,112,604 B2, the disclosure of which is incorporated herein by reference in its entirety. This method is based on the knowledge of the spectral shape of the data-carrying signal contribution provided by a reference signal. From this knowledge, the data-carrying signal contribution and the ASE-noise contribution, which otherwise appear as merged together on the optical spectrum trace, may be mathematically discriminated from each other. Knowledge of the spectral shape of the signal contribution may be derived from a prior acquisition of a reference signal taken. For example, the reference signal can be acquired at a different point, generally upstream, along the same optical communication link, where the OSNR is known or where the signal can be considered free of ASE noise. As such, the reference signal originates from the same optical transmitter as the signal under test. The method described in U.S. Pat. No. 9,112,604 B2 assumes that, within the optical signal bandwidth, the spectral shape of the signal does not significantly change along the communication link. The signal contribution of such a reference signal is therefore considered to be spectrally representative of the signal contribution of the signal under test. U.S. Pat. Appl. Pub. Nos. 2014/0328586 A1 and 2016/0127074 A1, the disclosures of which are incorporated herein by reference in their entirety, include provisions to account for spectral shape variations originating, for example, from nonlinear effects.

A method for determining in-band OSNR and other quality parameters in optical information signals, for example PM signals, is disclosed in U.S. Pat. Appl. Pub. No. 2016/0164599 A1. The method involves measuring an optical power spectrum of a noisy signal, for example by means of a conventional optical spectrum analyzer, and subsequently measuring correlations between a predetermined pair of spaced-apart time-varying frequency components in the optical amplitude or power/intensity spectrum of the signal by means of two optically narrow-band amplitude or power detectors. The in-band noise in the signal may be determined from the correlation measurement. A measurement of the signal power may be used to determine the OSNR based on the determined in-band noise. A drawback of this method is the complexity and high cost of the required apparatus, notably involving two full coherent receivers.

Challenges therefore remain in the development of techniques for discriminating signal from noise in optical signals used in telecommunication applications.

SUMMARY

The present description generally relates to techniques for spectrally characterizing an optical signal propagating along an optical communication link, for example an optical fiber. The optical signal can include a data-carrying signal contribution modulated at a symbol frequency within a data-carrying signal bandwidth, and a noise contribution including ASE noise. The present techniques leverage a spectral correlation property that exists within pairs of spectral components spectrally spaced apart by a quantity corresponding to the symbol frequency in the optical signal to allow an in-band determination of the spectrum shape of the data-carrying signal contribution discriminated from the spectrum shape of the noise contribution. Given the shape of both the noisy and noise-free spectra of the signal at the measurement location along the link, the OSNR or other signal quality parameters can be determined. A feature of some embodiments of the present techniques is the use of a large number of such pairs of correlated spectral components over the spectrum of the optical signal. As such, although deviations from perfect spectral correlation may affect the overall signal spectrum, they will generally preserve its shape. Such deviations can be due, for example, to chromatic dispersion (CD) and/or polarization-mode dispersion (PMD). Another feature of some embodiments of the present techniques is the use of relative spectrum shapes, which can eliminate or at least reduce the need for high-precision measurements compared to absolute measurement techniques.

In accordance with an aspect, there is provided a method for spectrally characterizing an optical signal propagating along an optical communication link, the optical signal including a data-carrying signal contribution modulated at a symbol frequency within a data-carrying signal bandwidth and a noise contribution. The method includes:

measuring an optical power spectrum of the optical signal over a spectral range within the data-carrying signal bandwidth, the measured optical power spectrum including a data-carrying signal power spectrum contribution associated with the data-carrying signal contribution of the optical signal and a noise power spectrum contribution associated with the noise contribution of the optical signal;

determining, from measurement, a spectral correlation function for a set of pairs of spectral components of the optical signal, the spectral components in each pair being spectrally separated from each other by the symbol frequency, the set of pairs being respectively centered on a corresponding set of center frequencies over a center frequency range within the spectral range, the measured spectral correlation function relating a correlation intensity between the spectral components of each pair to the center frequency of the pair over the center frequency range; and obtaining, using a processor, a solution representing the data-carrying signal power spectrum contribution based on the measured optical power spectrum of the optical signal, such that a calculated spectral correlation function for pairs of spectral components spectrally separated by the symbol frequency in the solution representing the data-carrying signal power spectrum contribution matches the measured spectral correlation function.

In some implementations, obtaining the solution representing the data carrying signal power spectrum contribution includes:

determining a solution representing the noise power spectrum contribution; and deriving the solution representing the data-carrying signal power spectrum contribution from the solution representing the noise power spectrum contribution and the measured optical power spectrum.

In some implementations, obtaining the solution representing the data-carrying signal power spectrum contribution includes:

providing a nonlinear regression model relating the measured optical power spectrum and the measured spectral correlation function; and using the nonlinear regression model to determine the solution representing the data-carrying signal power spectrum contribution.

In some implementations, the nonlinear regression model includes a set of adjustable parameters, the adjustable parameters including at least one of:

a model function representing a normalized model of the noise power spectrum contribution;

a noise-to-signal ratio parameter representative of a relative amplitude of the noise power spectrum contribution with respect to the data-carrying signal power spectrum contribution; and a dispersion parameter conveying information indicative of at least one of a chromatic dispersion and a polarization mode dispersion of the optical signal.

In some implementations, the method further includes determining an optical signal-to-noise ratio (OSNR) based on the measured optical power spectrum and the solution representing the data-carrying signal power spectrum contribution.

In some implementations, the method further includes averaging the measured optical power spectrum and the measured spectral correlation function over a plurality of polarization states of the optical signal.

In some implementations, determining, from measurement, the measured spectral correlation function includes measuring a beatnote amplitude function for a set of pairs of beating components respectively associated with the set of pairs of spectral components spectrally separated by the symbol frequency in the optical signal, the beating components in each pair being spectrally separated from each other by a beatnote frequency lower than the symbol frequency, the beatnote amplitude function representing the measured spectral correlation function In some implementations, a ratio of the symbol frequency to the beatnote frequency ranges from $10^3$ to $10^6$, preferably from $10^4$ to $10^5$.

In some implementations, measuring the beatnote amplitude function includes:

generating, from the optical signal, a double-sideband signal including a first image signal and a second image signal, the first and second image signals representing sideband images of the optical signal, the first and second image signals being spectrally separated from each other by a spectral shift equal to the symbol frequency plus or minus the beatnote frequency;

detecting and spectrally resolving the double-sideband signal within the spectral range; and determining, from the detected double-sideband signal, the beatnote amplitude function for the set of pairs of beating components, wherein one beating component of each pair is associated with the first image signal and the other beating component is associated with the second image signal.

In some implementations, detecting and spectrally resolving the double-sideband signal further includes:

generating a local oscillator (LO) signal having a tunable LO frequency;

combining the LO signal and the double-sideband signal into a combined signal; and detecting the combined signal while sweeping the tunable LO frequency within the spectral range.

In some implementations, measuring the beatnote amplitude function includes:

generating a local oscillator (LO) signal having a tunable LO frequency within the spectral range;

generating, from the LO signal, a double-sideband LO signal including a first LO image signal and a second LO image signal, the first and second LO image signals representing sideband images of the LO signal, the first and second LO image signals being spectrally separated from each other by a spectral shift equal to the symbol frequency plus or minus a beatnote frequency, the beatnote frequency being lower than the symbol frequency;

combining the double-sideband LO signal and the optical signal into a combined signal;

detecting and spectrally resolving the combined signal within the spectral range, while sweeping the tunable LO frequency; and determining, from the detected combined signal, the beatnote amplitude function for the set of pairs of beating components, wherein one beating component of each pair is associated with the first LO image signal and the other beating component is associated with the second LO image signal.

In some implementations, the method further includes reducing harmonics in the double-sideband LO signal.

In some implementations, the measured optical power spectrum and the measured spectral correlation function are obtained using a heterodyne optical spectrum analyzer.

It is to be noted that other method and process steps may be performed prior, during or after the above-described steps. The order of one or more of the steps may also differ, and some of the steps may be omitted, repeated and/or combined, depending on the application. It is also to be noted that some method steps can be performed using various signal processing and computational techniques, which can be implemented in hardware, software, firmware or any combination thereof.

In accordance with another aspect, there is provided a non-transitory computer readable storage medium having stored thereon computer readable instructions that, when executed by a processor, cause the processor to perform a method for spectrally characterizing an optical signal propagating along an optical communication link, the optical signal including a data-carrying signal contribution modulated at a symbol frequency within a data-carrying signal bandwidth and a noise contribution. The method includes:
  receiving a measured optical power spectrum of the optical signal over a spectral range within the data-carrying signal bandwidth, the measured optical power spectrum including a data-carrying signal power spectrum contribution associated with the data-carrying signal contribution of the optical signal and a noise power spectrum contribution associated with the noise contribution of the optical signal;
  receiving a measured spectral correlation function for a set of pairs of spectral components of the optical signal, the spectral components in each pair being spectrally separated from each other by the symbol frequency, the set of pairs being respectively centered on a corresponding set of center frequencies over a center frequency range within the spectral range, the measured spectral correlation function relating a correlation intensity between the spectral components of each pair to the center frequency of the pair over the center frequency range; and
  obtaining a solution representing the data-carrying signal power spectrum contribution based on the measured optical power spectrum of the optical signal, such that a calculated spectral correlation function for pairs of spectral components spectrally separated by the symbol frequency in the solution representing the data-carrying signal power spectrum contribution matches the measured spectral correlation function.

In some implementations, obtaining the solution representing the data carrying signal power spectrum contribution includes:
  determining a solution representing the noise power spectrum contribution; and
  deriving the solution representing the data-carrying signal power spectrum contribution from the solution representing the noise power spectrum contribution and the measured optical power spectrum.

In some implementations, obtaining the solution representing the data-carrying signal power spectrum contribution includes:
  providing a nonlinear regression model relating the measured optical power spectrum and the measured spectral correlation function; and
  using the nonlinear regression model to determine the solution representing the data-carrying signal power spectrum contribution.

In some implementations, the nonlinear regression model includes a set of adjustable parameters, the adjustable parameters including at least one of:
  a model function representing a normalized model of the noise power spectrum contribution;
  a noise-to-signal ratio parameter representative of a relative amplitude of the noise power spectrum contribution with respect to the data-carrying signal power spectrum contribution; and
  a dispersion parameter conveying information indicative of at least one of a chromatic dispersion and a polarization mode dispersion of the optical signal.

In some implementations, the method further includes determining an optical signal-to-noise ratio (OSNR) based on the measured optical power spectrum and the solution representing the data-carrying signal power spectrum contribution.

According to another aspect, there is provided a system or apparatus capable of implementing one or more steps of the above methods.

In some implementations, there is provided a system for spectrally characterizing an optical signal propagating along an optical communication link, the optical signal including a data-carrying signal contribution modulated at a symbol frequency within a data-carrying signal bandwidth and a noise contribution. The system includes:
  a spectral shifter configured to generate, in a first acquisition mode, a double-sideband signal from the optical signal, the double-sideband signal including a first image signal and a second image signal spectrally separated from each other by a spectral shift equal to the symbol frequency plus or minus a beatnote frequency, the beatnote frequency being lower than the symbol frequency;
  a spectrally resolved detector unit operable within a spectral range in the data-carrying signal bandwidth, the spectrally resolved detector unit being configured to detect the double-sideband signal in the first acquisition mode and output a first detected signal, and to detect the optical signal in a second acquisition mode and output a second detected signal; and
  a processor coupled to the spectrally resolved detector unit and configured to:
    determine or identify a measured optical power spectrum of the optical signal based on the second detected signal, the measured optical power spectrum including a data-carrying signal power spectrum contribution associated with the data-carrying signal contribution of the optical signal and a noise power spectrum contribution associated with the noise contribution of the optical signal;
    determine a spectral correlation function within pairs of spectral components of the optical signal, the spectral components in each pair being spectrally separated from each other by the symbol frequency, the spectral correlation function being determined by determining, based on the first detected signal, a beatnote amplitude function within pairs of beating components respectively associated with the pairs of spectral components, the beating components in each pair being spectrally separated from each other by the beatnote frequency, one associated with the first image signal and the other associated with the second image signal; and
    obtaining a solution representing the data-carrying signal power spectrum contribution based on the measured optical power spectrum of the optical signal, such that a calculated spectral correlation function for pairs of spectral components spectrally separated by the symbol frequency in the solution representing the data-carrying signal power spectrum contribution matches the measured spectral correlation function.

In some implementations, the spectrally resolved detector unit further includes:
- a local oscillator (LO) source generating an LO signal having a tunable LO frequency;
- an optical coupler for, in the first acquisition mode, combining the LO signal and the double-sideband signal into a first combined signal, and, in the second acquisition mode, combining the LO signal and the optical signal into a second combined signal;
- a heterodyne receiver for, in the first acquisition mode, receiving the first combined signal and generating therefrom the first detected signal, and, in the second acquisition mode, receiving the second combined signal and generating therefrom the second detected signal; and
- a sweep controller coupled to the LO source for sweeping the tunable LO frequency within the spectral range in the first and second acquisition modes.

In some implementations, the spectral shifter is an electro-optical modulator.

In some implementations, the system further includes a polarization analyzer disposed upstream of the spectrally resolved detector unit, the polarization analyzer including:
- a polarization scrambler configured to vary a polarization state of the optical signal or the double-sideband signal as a function of time; and
- a polarizer configured to pass a fixed polarization component of the optical signal or the double-sideband signal in the varied polarization state.

In some implementations, the system further includes an optical channel selector configured to select the optical signal from a selected one of a plurality of spaced-apart optical channels.

In some implementations, there is provided a system for spectrally characterizing an optical signal propagating along an optical communication link, the optical signal including a data-carrying signal contribution modulated at a symbol frequency within a data-carrying signal bandwidth and a noise contribution. The system includes:
- a spectrally resolved detector unit operable within a spectral range in the data-carrying signal bandwidth, the spectrally resolved detector unit including:
  - a local oscillator (LO) source generating an LO signal having a tunable LO frequency;
  - an LO spectral shifter configured to generate, in a first acquisition mode, a double-sideband LO signal from the LO signal, the double-sideband LO signal including a first LO image signal and a second LO image signal spectrally separated from each other by a spectral shift equal to the symbol frequency plus or minus a beatnote frequency, the beatnote frequency being lower than the symbol frequency;
  - an optical coupler for, in the first acquisition mode, combining the double-sideband LO signal and the optical signal into a first combined signal, and, in the second acquisition mode, combining the LO signal and the optical signal into a second combined signal;
  - a heterodyne receiver for, in the first acquisition mode, receiving the first combined signal and generating therefrom a first detected signal, and, in the second acquisition mode, receiving the second combined signal and generating therefrom a second detected signal; and
  - a sweep controller coupled to the LO source for sweeping the tunable LO frequency within the spectral range in the first and second acquisition modes; and
- a processor coupled to the spectrally resolved detector unit and configured to:
  - determine or identify a measured optical power spectrum of the optical signal based on the second detected signal, the measured optical power spectrum including a data-carrying signal power spectrum contribution associated with the data-carrying signal contribution of the optical signal and a noise power spectrum contribution associated with the noise contribution of the optical signal;
  - determine a spectral correlation function within pairs of spectral components of the optical signal, the spectral components in each pair being spectrally separated from each other by the symbol frequency, the spectral correlation function being determined by determining, based on the first detected signal, a beatnote amplitude function within pairs of beating components respectively associated with the pairs of spectral components, the beating components in each pair being spectrally separated from each other by the beatnote frequency, one associated with the first LO image signal and the other associated with the second LO image signal; and
  - obtaining a solution representing the data-carrying signal power spectrum contribution based on the measured optical power spectrum of the optical signal, such that a calculated spectral correlation function for pairs of spectral components spectrally separated by the symbol frequency in the solution representing the data-carrying signal power spectrum contribution matches the measured spectral correlation function.

In some implementations, the LO spectral shifter is an electro-optical modulator.

In some implementations, the system further includes a polarization analyzer disposed upstream of the spectrally resolved detector unit, the polarization analyzer including:
- a polarization scrambler configured to vary a polarization state of the optical signal as a function of time; and
- a polarizer configured to pass a fixed polarization component of the optical signal having the varied polarization state.

Other features and advantages of the present description will become more apparent upon reading of the following non-restrictive description of specific embodiments thereof, given by way of example only, with reference to the appended drawings. Although specific features described in the above summary and in the detailed description below may be described with respect to specific embodiments or aspects, it should be noted that these specific features can be combined with one another, unless stated otherwise.

BRIEF DESCRIPTION OF THE DRAWINGS

In FIG. 6, the input signal is a narrow tone at frequency $\nu_i$ and the output signal consists of two narrow tones at frequencies $\nu_i \pm \delta_\leftrightarrow$, the two output tones being spectrally shifted sideband image of the input narrow tone.

In FIG. 8, the 2-ν spectral shifter is embodied by a double drive Mach-Zehnder (DDMZ) electro-optic interferometer set as an amplitude modulator.

DETAILED DESCRIPTION

Figure 1:
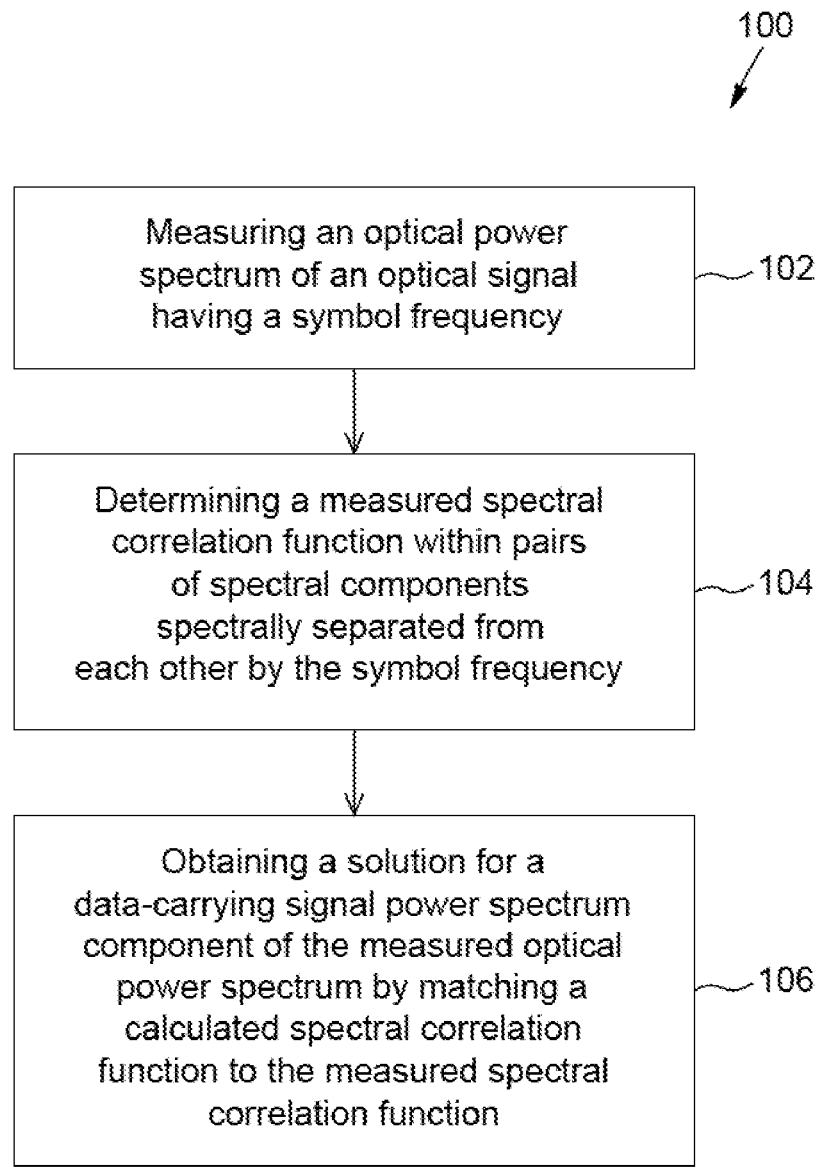
FIG. 1 is a flow chart of a method for spectrally characterizing an optical signal propagating along an optical communication link, in accordance with a possible embodiment.

In the present description, similar features in the drawings have generally been given similar reference numerals. To avoid cluttering certain figures, some elements may not be indicated, if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

Unless stated otherwise, the terms "connected" and "coupled", and derivatives and variants thereof, refer herein to any connection or coupling, either direct or indirect, between two or more elements. For example, the connection or coupling between the elements may be mechanical, optical, electrical, magnetic, logical, or a combination thereof.

In the present description, the term "measured" when referring to a quantity or parameter is intended to mean that the quantity or parameter can be measured either directly or indirectly. In the case of indirect measurement, the quantity or parameter can be derived, retrieved, inferred or otherwise determined from directly measured data.

The terms "a", "an" and "one" are defined herein to mean "at least one", that is, these terms do not exclude a plural number of elements, unless stated otherwise. It should also be noted that terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

The terms "light" and "optical" are used to refer herein to radiation in any appropriate region of the electromagnetic spectrum. More particularly, these terms are not limited to visible light, but can also include invisible regions of the electromagnetic spectrum including, without limitation, the terahertz (THz), infrared (IR) and ultraviolet (UV) spectral bands. For example, in non-limiting embodiments, the imaging systems that can implement the present techniques can be sensitive to light having a wavelength band lying somewhere in the range from about 1250 nm to about 1650 nm. Those skilled in the art will understand, however, that this wavelength range is provided for illustrative purposes only and that the present techniques may operate beyond this range.

The present description discloses various implementations of techniques for in-band—that is, within the signal bandwidth—spectral characterization of an optical signal propagating along an optical communication link, for example an optical fiber.

The present techniques may be useful in various applications where it is desired or required to measure spectral properties of an optical signal in telecommunication applications. For example, some of the present techniques can be applied to, or implemented in, different types of optical communication networks including, without limitation, typical metro and long-haul systems using signal modulation schemes in the ITU grid, such as QPSK or M-QAM (where M can be, e.g., 16, 32, 64, 128 or 256) at 28 Gb/s and higher rates. The signals can be pulse-shaped or not, and be polarized or polarization-multiplexed. The present techniques may be used to ensure or help ensure that an optical network is reliable and operates within acceptable industry specifications. The present techniques can be implemented in various environments and settings, including field-deployed networks, manufacturing facilities for network equipment, research and development laboratories, data centers, and the like. Furthermore, the present techniques can be employed during the installation, activation and/or operation phases of an optical communication network for characterization, error diagnosis and troubleshooting, and/or performing monitoring.

In some implementations, there is provided an in-band measurement method allowing determination of the spectrum shape of a PM signal discriminated from the ASE-noise background (ASE-free) at the measurement location. Given both the signal-plus-ASE and the ASE-free spectrum-shapes of the signal at the measurement location, the OSNR can be computed according to any standard or custom definitions. The present techniques, however, are not limited to OSNR measurements and have a larger scope of application, since they involve the determination of spectra over a large spectral range, both with and without ASE noise, and not only a single OSNR value. Computing the OSNR from this data can be viewed as one specific application among a variety of other possible applications.

Some implementations of the present techniques leverage an intrinsic or natural spectral correlation property of optical signals to provide a reference signal-spectrum measured "in situ" at a measurement location or point along an optical communication link. This reference signal-spectrum can then be used in OSNR measurement methods, such as the one described in co-owned U.S. Pat. No. 9,112,604 B2. However, in its full generality, the present techniques can provide a mathematical analysis of measured data based on the physics of the situation, where this measured data can be obtained with different systems and apparatuses. For example, theory, principles and specific algorithms of some embodiments disclosed herein are based on definitions of measured physical quantities regardless of the actual apparatus implementation.

Some implementations of the present techniques can overcome or reduce drawbacks or limitations of the method disclosed in U.S. Pat. Appl. Pub. No. 2016/0164599 A1. Such drawbacks and limitations can include the high-precision measurement requirements that stem from the assumption of a perfect spectral correlation between the predetermined pair of frequency components and from the absolute nature of the measurements, and the potential lack of robustness resulting from the high-accuracy measurements and the fine adjustments and calibration that the implementation of this method would require.

Method Implementations

Various aspects of a method for spectrally characterizing an optical signal propagating along an optical communication link will now be described. The optical signal can generally be described as including two contributions: a data-carrying signal contribution modulated at a symbol frequency within a data-carrying signal bandwidth, and a noise contribution that typically includes ASE noise.

Referring to FIG. 1, there is provided a flow chart of a possible embodiment of a method 100 for spectrally characterizing an optical signal propagating along an optical communication link. Broadly stated, and as described in greater detail below, the method 100 can include a step 102 of measuring an optical power spectrum of the optical signal over a spectral range within the data-carrying signal bandwidth. The measured optical power spectrum generally includes a data-carrying signal power spectrum contribution associated with the data-carrying signal contribution of the optical signal and a noise power spectrum contribution associated with the noise contribution of the optical signal, for example ASE noise.

The method 100 can also include a step 104 of determining, from measurement, a spectral correlation function for a set of pairs of spectral components of the optical signal under test. In each pair, the spectral components are spectrally separated from each other by the symbol frequency and are centered on a respective one of a set of center frequency values in a center frequency range within the spectral range. The measured spectral correlation function represents a variation in an intensity of correlation within the pairs of spectral components as a function of center frequency. As described in greater detail below, in some implementations, the step 104 of determining the spectral correlation function can include steps of measuring a beatnote amplitude function for a set of pairs of beating components respectively associated with the set of pairs of spectral components, and identifying the measured beatnote amplitude function as the spectral correlation function to be determined. In such a case, the beating components in each pair are spectrally separated from each other by a beatnote frequency, which is the same for all the pairs and substantially lower than the symbol frequency. The beatnote amplitude function represents a variation in the beatnote amplitude between the beating components of each pair as a function of the center frequency of the associated pair of spectral components.

The method 100 can further include a step 106 of obtaining, using a processor, a solution representing the data-carrying signal power spectrum contribution of the measured optical power spectrum. The solution, which uses the measured optical power spectrum as an input, is such that a calculated spectral correlation function for pairs of spectral components separated by the symbol frequency in the solution matches the measured spectral correlation function. In the present description, the terms "match", "matching" and "matched" are meant to encompass not only "exactly" or "identically" matching the measured and calculated spectral correlation functions, but also "substantially", "approximately" or "subjectively" matching the measured and calculated spectral correlation functions, as well as providing a higher or best match among a plurality of matching possibilities. The terms "match", "matching" and "matched" are therefore intended to refer herein to a condition in which two elements are either the same or within some predetermined tolerance of each other. Furthermore, the term "representing" is used in this context to indicate that the match between the solution found by the method 100 and the data-carrying signal power spectrum contribution of the actual measured value of the optical power spectrum can be either absolute or relative. For example, in some implementations, the solution can be a normalized spectrum proportional to the data-carrying signal power spectrum contribution of the measured value of the optical power spectrum.

In some implementations, the step 106 of obtaining the solution for the data-carrying signal power spectrum contribution can include a step of performing a nonlinear regression analysis based on a nonlinear regression model. The nonlinear regression model can use a set of adjustable parameters to relate the measured optical power spectrum and the measured spectral correlation over the center frequency range. In some implementations, the adjustable parameters can include, without limitation, a model function representing a normalized model of the noise power spectrum contribution (which can itself be defined by one or more adjustable parameters); a noise-to-signal ratio parameter representative of a relative amplitude of the noise power spectrum contribution with respect to the data-carrying signal power spectrum contribution; and a dispersion parameter conveying information indicative of chromatic dispersion and/or polarization mode dispersion of the optical signal along the optical communication link. The measured data can be fitted using a method of successive approximations, in which an initial set of parameter values is iteratively refined until a suitable match is obtained between the model and the measured data.

In some implementations, the method 100 can include a step of determining an optical signal-to-noise ratio (OSNR) based on the measured optical power spectrum and the solution representing the data-carrying signal power spectrum contribution. For example, in some cases, the method 100 can yield normalized solutions for the data-carrying signal power spectrum contribution and the noise power spectrum contributions and a noise-to-signal ratio, and these three parameters can be used to determine the OSNR.

These and other possible method steps and variants according to the present techniques will be described in greater detail below.

Intrinsic Spectral-Correlation Property

Modulated signals have a "hidden" periodicity, even if the individual symbols are mutually independent random variables. This is reflected in the frequency domain (Fourier transform, spectrum) as a theoretical 100% correlation between spectral components separated by exactly $f_{sb}$, where $f_{sb}$ is the symbol frequency (baud rate). More precisely, for any random sequence of symbols, the two spectral components of all such pairs have the same phase difference. Considering discrete signals (sampled), this can be expressed at the transmitter end as, $$\text{Definition: } C(f\bullet) \equiv |\langle \mathcal{E}(f_+) \cdot \mathcal{E}^*(f_-) \rangle_{sb}| \qquad (1)$$

$$\text{Value: } C(f\bullet) = \langle [P(f_+) \cdot P(f_-)]^{1/2} \rangle_{sb} \delta_{(f_+ - f_-) = f_{sb}}, \text{ where}$$
$$f\bullet = \frac{1}{2}(f_+ + f_-) \text{ and } P(f_\pm) = |\mathcal{E}(f_\pm)|^2, \qquad (2)$$

where $\mathcal{E}(f\bullet)$ is a Jones vector representing the discrete Fourier transform (DFT) of the time-varying optical field $\mathcal{E}(t)$ (two-component complex phasor), that is, the modulated optical carrier with state of polarization (SOP) included, $\langle \ldots \rangle_{sb}$ represents an average over all possible sequences of symbols (sb), and $C(f\bullet)$ is the correlation between the two spectral components $f_\pm = (f\bullet \pm \frac{1}{2}f_{sb})$, where $f\bullet$ is the center frequency. In other words, Eq. (1) indicates that the correlation between these components is equal to the square root of the product of their powers, and zero if $(f_+ - f_-) \neq f_{sb}$. This signal property is made use of in embodiments described herein. Indeed, since ASE noise and other noise contributions generally do not have this property (C=0), knowledge of C(f•) gives, according to Eq. (2), the power of the signal at frequencies $f_+$ and $f_-$, or more exactly the square root of the product of the two powers, which in practice is integrated over a small frequency range [finite resolution, window w(f), see, e.g., FIGS. 2A and 2B and Eq. (4a) below].

Definitions of Spectral Quantities

Figure 2A:
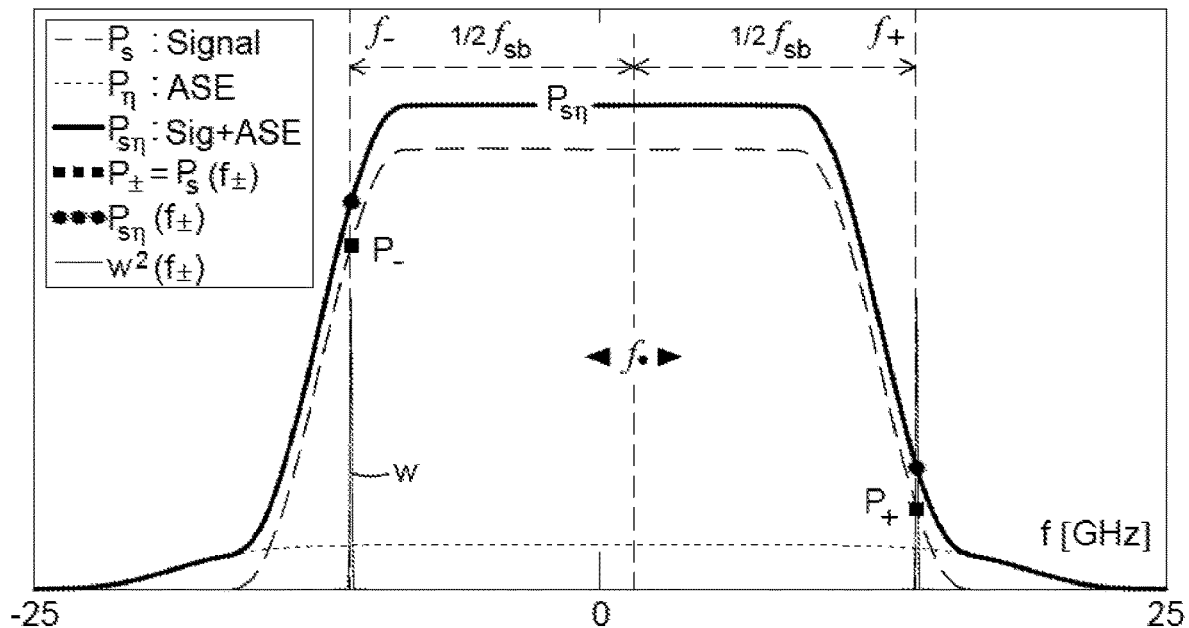
FIGS. 2A and 2B are graphs illustrating examples of measured spectral parameters and other relevant quantities used in some embodiments described herein.
Figure 2B:
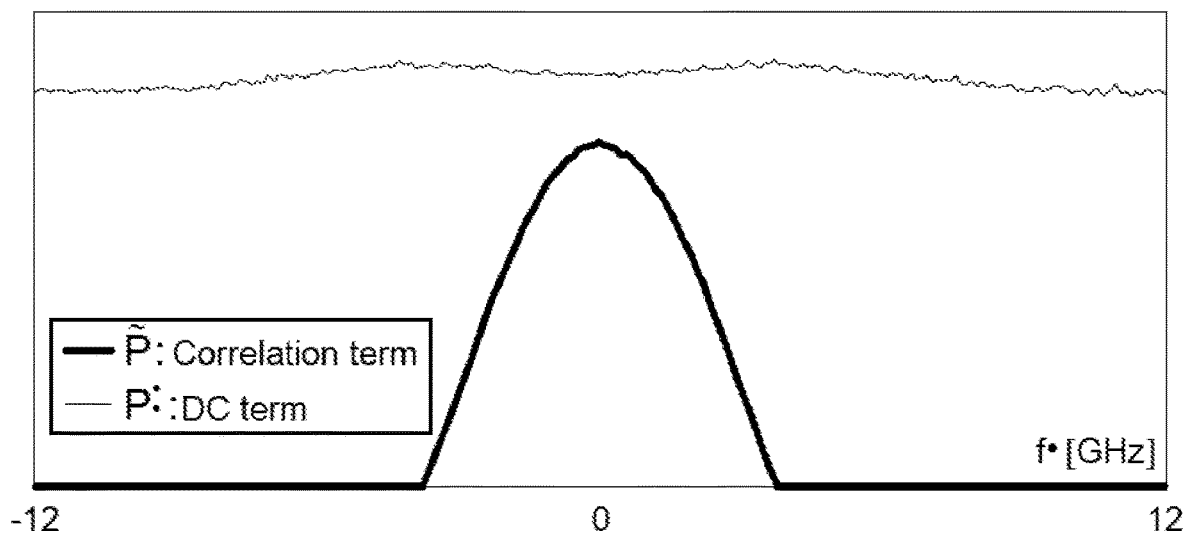

Referring to FIGS. 2A and 2B, there are provided definitions of measured data and other relevant quantities for some embodiments described herein. The graphs of FIGS. 2A and 2B illustrate the significance of these quantities through a simple example with the following specifications: the modulation format is 100 Gb/s PM-NRZ-QPSK with symbol rate $f_{sb}$=25 GHz; the signal spectral density at the transmitter end is a root-raised-cosine with roll-off β=0.3;

and the ASE noise generated along the link by optical amplifiers has a flat spectrum. At the measurement location, both the signal and the ASE noise have gone through a common optical filter whose shape is a $4^{th}$-order super-Gaussian with FWMH=35 GHz, with no propagation effects due to chromatic dispersion (CD) and polarization-mode dispersion (PMD). The window w(f) is Gaussian with an equivalent noise bandwidth $B_w$=100 MHz. The OSNR at f=0 (traditional definition) is 10 dB (such a low OSNR value is used to make things more obvious on the graphs). The graphs of FIGS. 2A and 2B are simulation results.

Definition of Measured Data

In some implementations, the quantities that constitute the measured data—regardless of the apparatus used to measure them—are as follows. These quantities are shown as thick solid lines in FIGS. 2A and 2B.

$P_{sn}(f)$ is the optical power spectrum (i.e., "signal+ASE" spectrum) of the optical signal to be characterized: $P_{sn}(f) = P_s(f) + P_n(f)$ \qquad (3)

The values of $P_{sn}(f)$ at $f_+$ and $f_-$ are shown as black circles in FIG. 2A.

$\tilde{P}(f\bullet)$ is a correlation term, referred to herein as the "spectral correlation function", corresponding to a power representative of correlation (1). It can be written in all generality as $$\tilde{P}^2(f\bullet) = \langle |\int w^2(f) \mathcal{E}(f_+ + f) \cdot \mathcal{E}^*(f_- + f) df|^2 \rangle_{sb}, \text{ where}$$
$$f_\pm = (f\bullet \pm \frac{1}{2}f_{sb}) \text{ and } w^2(f) = |w(f)|^2. \qquad (4a)$$

When w(f) is made narrow enough to be approximated as w(f)=δ(f) (Dirac delta function), Eq. (4a) reduces to $$\tilde{P}^2(f\bullet) = P_+(f\bullet)P_-(f\bullet), \qquad (4b)$$

Other Definitions

P(f) In general, a power spectrum, corresponding to a convolution of a spectral density with $w^2(f)$, as measured for example by an optical spectrum analyzer (OSA).

w(f) A window or filter transfer function. Measured quantities such as the optical power spectrum and the spectral correlation function correspond to the convolution with a window $w^2(f)$ of some finite width [see Eq. (4a)]. The two peaks corresponding to w(f) in FIG. 2A are shown with thin solid lines.

$B_w$ Equivalent noise bandwidth (ENB) of $w^2(f)$, $B_w = \int_{-\infty}^{\infty} w^2(f) df / w^2(0)$.

$P_s(f)$ ASE-free signal spectrum, corresponding to the data-carrying signal component of $P_{sn}(f)$. In the present description, variables pertaining to the data-carrying signal are generally identified by the index "s". $P_s(f)$ is shown with a thin dashed line in FIG. 2A.

$P_n(f)$ ASE-noise spectrum, corresponding to the noise contribution of $P_{sn}(f)$. In the present description, variables pertaining to noise are generally identified by the index "η". $P_n(f)$ is shown with a thin dotted line in FIG. 2A.

$P_\pm(f\bullet)$ Signal power at $f = f_\pm$, such that $P_\pm(f\bullet) = P_s(f_\pm)$ \qquad (5)

The values of $P_s(f)$ at $f_+$ and $f_-$ are shown as black squares in FIG. 2A.

$P'(f\bullet)$ Mean "signal+ASE" power at $f\bullet$, such that
$P'(f\bullet) = \frac{1}{2}[P_{sn}(f_+) + P_{sn}(f_-)]$. \qquad (6)

This quantity is also referred to herein as a "DC term", and may be measured along with $\tilde{P}^2(f\bullet)$ in some implementations. P'(f•) is shown as a thin solid line in FIG. 2B.

Figure 3:
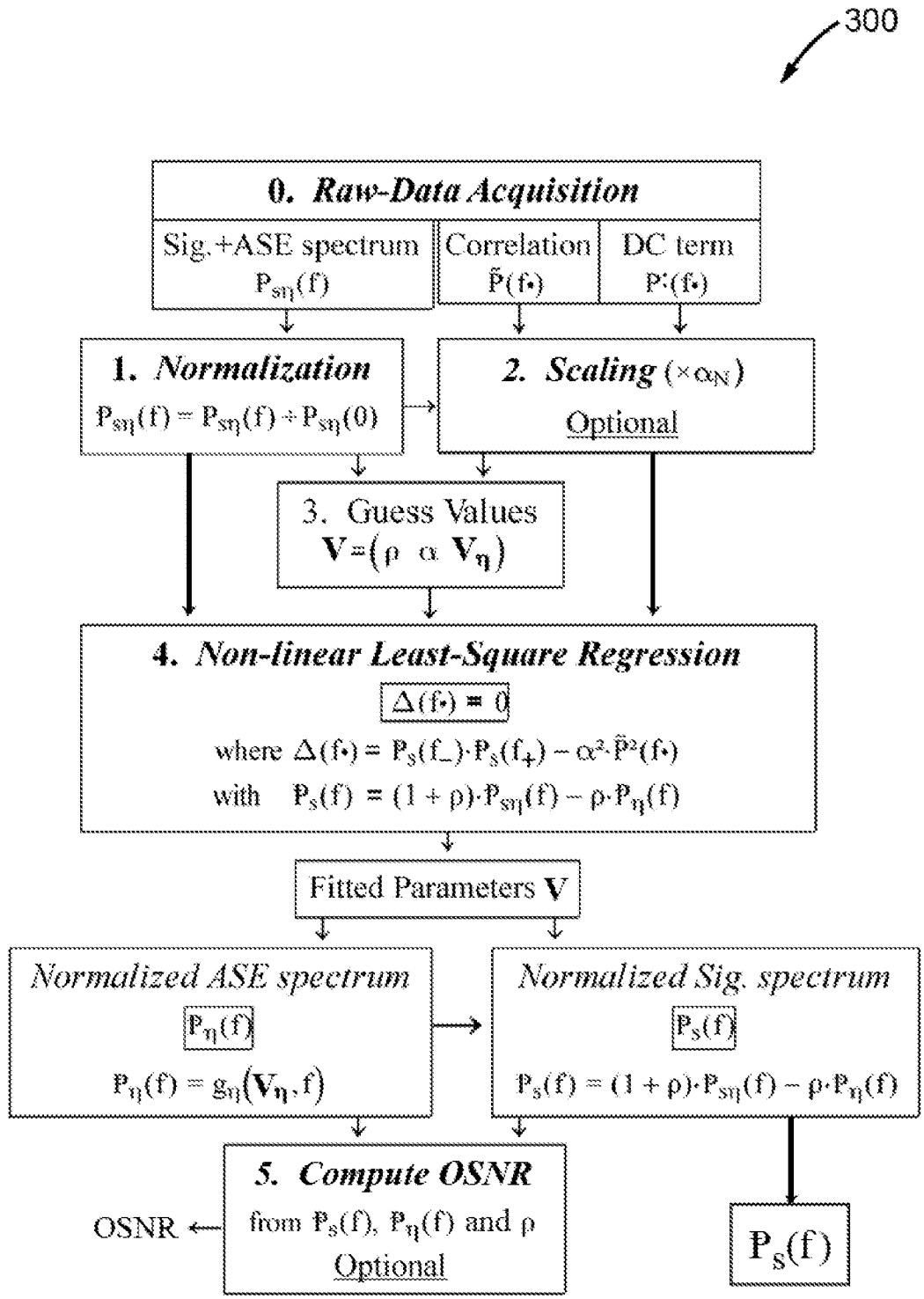
FIG. 3 is a flow chart of a method for spectrally characterizing an optical signal propagating along an optical communication link, in accordance with another possible embodiment.

Step-by-Step Description of an Exemplary Embodiment of a Method for Spectrally Characterizing an Optical Signal Propagating Along an Optical Communication Link Referring to FIG. 3, there is provided a flow chart of an exemplary embodiment of a method 300 for spectrally characterizing an optical signal propagating along an optical communication link. The optical signal to be characterized includes a data-carrying signal contribution modulated at a symbol frequency $f_{sb}$ within a data-carrying signal bandwidth and a noise contribution. A step-by-step description of this exemplary embodiment is provided below.

Step 0: Raw-Data Acquisition

It is assumed that regardless of the apparatus used to implement the method 300 in FIG. 3, the data consisting of the optical power spectrum $P_{sn}(f)$ and the spectral correlation function $\tilde{P}(f\bullet)$ defined by Eqs. (3), (4a) and (4b) are measured, or determined from measurement, over a range of frequencies f, for $P_{sn}(f)$, and a range of center frequencies f•, for $\tilde{P}(f\bullet)$. The range of frequencies f substantially encompasses the channel slot (e.g., typically 50 GHz) as shown in FIG. 2A. Under this assumption, the embodiment of the method 300 proceeds as illustrated in the flow chart of FIG. 3.

More particularly, step 0 in FIG. 3 can include a step of measuring the optical power spectrum $P_{sn}(f)$ over a spectral range within the optical signal bandwidth of the signal to be characterized. The optical power spectrum $P_{sn}(f)$ can be conceptually written as the sum of two terms as follows: $P_{sn}(f) = P_s(f) + P_n(f)$, where the term $P_s(f)$ is the spectrum component associated with the data-carrying signal contribution of the optical signal, and the term $P_n(f)$ spectrum component of $P_{sn}(f)$, associated with the noise contribution of the optical signal.

Step 0 can also include a step of determining, from measurement, a spectral correlation function $\tilde{P}^2(f\bullet)$ within a set of pairs of spectral components spectrally separated by the symbol frequency $f_{sb}$ in the optical signal under test. The set of pairs of spectral components are respectively centered on a corresponding set of center frequencies over a center frequency range. As mentioned above, the function $\tilde{P}^2(f\bullet)$ describes how the correlation between the spectral components within each pair varies as a function of the center frequency of the pair.

In some implementations, step 0 of the method 300 may further include a step of determining, from measurement, a value for the DC term $P^{\cdot}(f\bullet)$. The determination of the DC term $P^{\cdot}(f\bullet)$ can be made using a different measurement process than the one used to measure optical power spectrum $P_{sn}(f)$. This different measurement process can be the same as the one used to determine the spectral correlation function $\tilde{P}^2(f\bullet)$.

The Square Modulus:

It should be noted that a difference exists between Eq. (1) and the definition of Eq. (4a) for $\tilde{P}(f\bullet)$, in that the modulus operator $| \ldots |$ is inside the averaging operator $\langle \ldots \rangle_{sb}$ in Eq. (4a). A consequence of this difference is an offset $\delta_{\|}(f\bullet)$ adding to $\tilde{P}^2(f\bullet)$ compared to (4b), that is, $$\tilde{P}^2(f\bullet) = P_+(f\bullet)P_-(f\bullet) + \delta_{\|}(f\bullet), \text{ where } \delta_{\|}(f\bullet) \sim P_{sn}(f_+)P_{sn}(f_-) \div [1 + B_{eq} \cdot \Delta t] \text{ with } B_{eq} = \int_{-\infty}^{\infty} w(f) df / w(0), \quad (7)$$

where $\Delta t$ is the finite duration of the signal $\mathscr{E}(t)$ from which the DFT $\mathscr{E}(f)$ is obtained, and $B_{eq}$ is the equivalent width of w(f) (i.e., a rectangular window of width $B_{eq}$ gives the same).

It is to be noted that the seemingly inconvenient offset $\delta_{\|}$ becomes negligible if $B_{eq} \cdot \Delta t \gg 1$, which is expected to be readily fulfilled in practice. For example, in the case of a Gaussian window of ENB, $B_w = 100$ MHz, corresponding to $B_{eq} = 141$ MHz, even an acquisition time $\Delta t$ as short as 10 millisecond (ms) already gives $B_{eq} \cdot \Delta t = 1.4 \times 10^6$. Consequently, the otherwise advantageous average of the square modulus can be used because, while $\mathscr{E}(f)$ is the DFT of a finite-duration sequence, which implies a finite resolution (bin) $df = 1/\Delta t$, the correlation is integrated over a width $B_{eq}$ much larger than df. This imposes a lower bound to $B_w$ given some $\Delta t$, or vice versa, but this lower bound is generally not an expected limitation. An advantage of taking the average of the square modulus is that it is generally insensitive to CD and PMD, which can remove the requirement present in some existing systems to measure CD and PMD.

Step 1: Normalization of $P_{sn}(f)$

The method 300 can include a step 1 of computing a normalized value $\mathbf{P}_{sn}(f)$ for the measured optical power spectrum $P_{sn}(f)$. Step 1 can involve dividing each data point of the measured optical power spectrum $P_{sn}(f)$ by the value of $P_{sn}(f)$ measured at the center (i.e., at f=0) of the data-carrying signal bandwidth of the optical signal under test, such that $\mathbf{P}_{sn}(f) = P_{sn}(f)/P_{sn}(0)$ with $\mathbf{P}_{sn}(0) = 1$.

It is to be noted that, in the present description, all normalized spectra represented by the symbol "$\mathbf{P}$" have the same definition, that is, $$\mathbf{P}(0) \equiv 1 \text{ (definition of a normalized spectrum)}. \quad (8)$$

Step 2: Scaling of $\tilde{P}(f\bullet)$ and $P^{\cdot}(f\bullet)$

As mentioned above, in some implementations, the method 300 in FIG. 3 may include a step 2 of measuring, along with the spectral correlation function $\tilde{P}(f\bullet)$, a quantity corresponding to the DC term $P^{\cdot}(f\bullet)$ defined by Eq. (6) and plotted in FIG. 2B. This can be the case, for example, when the method 300 is implemented with systems and apparatuses using a low-frequency beatnote approach such as described below. In such a case, $P^{\cdot}(f\bullet)$ and $\tilde{P}^2(f\bullet)$ represent the DC component and the beating component of the detected signal, respectively.

It is to be noted that depending on the application, step 2 may be omitted, but can be useful to provide a quantitative physical interpretation of the parameter $\alpha$ found by nonlinear regression (see, e.g., step 4 below). It is also to be noted that, in practice, the measurement process to obtain $\tilde{P}(f\bullet)$ and $P^{\cdot}(f\bullet)$ may differ from the measurement process to obtain $P_{sn}(f)$, so that the raw determined values for $P^{\cdot}(f\bullet)$ may differ from those which would be obtained from Eq. (6) using the measured value of $P_{sn}(f)$. In such a case, the scaling step 2 can involve multiplying both the DC term $P^{\cdot}(f\bullet)$ and the spectral correlation term $\tilde{P}(f\bullet)$ by a common scaling factor $\alpha_N$. The scaling factor $\alpha_N$ is chosen such that when $P^{\cdot}(f\bullet)$ is scaled by $\alpha_N$, the relationship $P^{\cdot}(f\bullet) = \frac{1}{2}[\mathbf{P}_{sn}(f_+) + \mathbf{P}_{sn}(f_-)]$ is fulfilled, where the right-hand side is computed from the measured normalized spectrum $\mathbf{P}_{sn}(f)$. It should be noted that, in general, measuring or determining the parameter $P^{\cdot}(f\bullet)$ may be omitted when the scaling step 2 is not performed.

Step 3: Guess Values

Referring still to FIG. 3, the method 300 can also include performing a nonlinear regression analysis to determine the data-carrying signal power spectrum contribution $P_s(f)$—or its normalized value $\mathbf{P}_s(f)$—from $\mathbf{P}_{sn}(f)$, $\tilde{P}(f\bullet)$ and, optionally, $P^{\cdot}(f\bullet)$. Performing a nonlinear regression analysis generally involves providing initial values or estimates for a set of adjustable parameters used in a nonlinear regression model that relates the measured optical power spectrum and the measured spectral correlation over a certain spectral range. Various techniques exist for determining initial estimates of a nonlinear regression analysis and the choice of initial estimates may influence the convergence of the algorithm.

In the present embodiment, the set of adjustable parameters can be represented as a vector denoted V. The vector V can include the parameters ($\rho\alpha$), introduced below, and a set of $N_\eta$ additional parameters grouped in the vector $V_\eta$ and representing the adjustable parameters of a model function $\hat{g}_\eta(V_\eta, f)$. This can be written as $$V = (\rho \alpha V_\eta). \tag{9}$$

Definition:

In some embodiments, the model function $\hat{g}_\eta(V_\eta, f)$ is defined as a function of f that is normalized according to Eq. (8), that is, $\hat{g}_\eta(V_\eta, 0) \equiv 1$, where $V_\eta$ is a vector whose $N_\eta$ elements represents $N_\eta$ adjustable parameters. Different values of $V_\eta$ correspond to different shapes of the curve $\hat{g}_\eta(f)$ as a function of f. Depending on the application, the $N_\eta$ elements of $V_\eta$ can be scalars, vectors, matrices or any other appropriate mathematical entity.

Condition:

In some implementations, a necessary and sufficient condition regarding $\hat{g}_\eta(V_\eta, f)$ is the existence of a value of $V_\eta$ such that $\hat{g}_\eta(V_\eta, f)$ is substantially equal to the actual normalized ASE-noise spectrum $\tilde{P}_\eta(f)$. In general, there is no a priori prescription regarding the form of $\hat{g}_\eta$, the number $N_\eta$ of parameters, or the nature of the parameters (scalars, vectors, matrices, etc.). A simple form of $\hat{g}_\eta(V_\eta, f)$ with a few scalar parameters may be sufficient in some cases, and a more complex function with more parameters may be needed in other cases. It is foreseeable that simple shapes of $\tilde{P}_\eta(f)$ over the width of a channel slot that are still common presently, such as a simple constant, a straight line or a parabola, may change as system architectures evolve. The determination of whether a particular form for $\hat{g}_\eta(V_\eta, f)$ is sufficiently general will depend on the application, notably on the required or desired accuracy of the regression analysis. Non-limiting examples of model $\hat{g}_\eta(V_\eta, f)$ that may be used for $\tilde{P}_\eta(f)$ are provided in Table I below.

Step 4: Nonlinear Least-Square Regression

In the present embodiment, the measured data include the optical power spectrum $P_{s\eta}(f)$, the spectral correlation function $\tilde{P}(f\bullet)$ and, optionally, the DC term $P'(f\bullet)$. This means, more particularly, that the data-carrying signal power spectrum contribution $P_s(f)$ and the noise power spectrum contribution $P_\eta(f)$ of the measured optical power spectrum $P_{s\eta}(f)$ are a priori unknown at the start of the method 300.

The method 300 of FIG. 3 can include a step of obtaining, using a processor, a solution for, or representing, the data-carrying signal power spectrum contribution $P_s(f)$. The solution for $P_s(f)$ such that a calculated spectral correlation function associated with or obtained from the solution for $P_s(f)$ matches the measured spectral correlation function $\tilde{P}^2(f\bullet)$ over the range of center frequencies encompassing $\tilde{P}^2(f\bullet)$. In some implementations, this step can include first determining a solution representing the ASE-noise power spectrum $P_\eta(f)$, for example $\hat{g}_\eta(V_\eta, f)$ and then subtracting or removing the solution for $P_\eta(f)$ from the measured spectrum $P_{s\eta}(f)$ to yield the solution for $P_s(f)$.

In some implementations, a nonlinear least-square regression analysis can be used to find the unknown ASE-noise spectrum $P_\eta(f)$ such that Eq. (4b) is satisfied, or in other words, find $P_\eta(f)$ such that the following difference is zero—or minimized to an appropriate degree—all over the range of f•, $$\Delta(f\bullet) = P_s(f_+) \cdot P_s(f_-) - \tilde{P}^2(f\bullet) = 0, \tag{10}$$

where the unknown $P_s(f)$ can be written as, $$P_s(f) = P_{s\eta}(f) - P_\eta(f). \tag{11}$$

Substituting Eq. (11) for $P_s(f)$ in Eq. (10), yields $$\Delta(f\bullet) = [P_{s\eta}(f_+) - P_\eta(f_+)] \cdot [P_{s\eta}(f_-) - P_\eta(f_-)] - \tilde{P}^2(f\bullet), \tag{12}$$

in which the only unknown is $P_\eta(f)$. Once $P_\eta(f)$ is found by minimizing $\Delta(f\bullet)$, the signal spectrum $P_s(f)$, which is to be obtained in accordance with the present method 300, can be found from Eq. (11).

In some implementations, Eqs. (10) to (12) may be expressed differently to facilitate their use. For example, defining the following normalized spectra in accordance with Eq. (8) yields $$\tilde{P}_s(f) = P_s(f)/P_{s0} \text{ and } \tilde{P}_\eta(f) = P_\eta(f)/P_{\eta 0}, \text{ where } P_{s0} = P_s(0) \text{ and } P_{\eta 0} = P_\eta(0), \tag{13}$$

TABLE I

Examples of model functions $\hat{g}_\eta(V_\eta, f)$

| Type | $\hat{g}_\eta(V_\eta, f)$ | $V_\eta$ | $N_\eta$ | Possible guess value |
|---|---|---|---|---|
| Constant | 1 | — | 0 | — |
| Parabola | $1 + c_1 f + c_2 f^2$ | $(c_1\ c_2)$ | 2 | (0 0) |
| Super-Gaussian | $\exp\{-\ln(2)[(\|f - f_o\|f^{1/2})^n - \|f_o/f^{1/2}\|^n]\}$ | $(n\ f^{1/2}\ f_0)$ | 3 | (8 HWHM 0) HWHM: Half-width at half maximum of the transmission channel |
| Π of K super-Gaussians | $\exp\{-\ln(2)\Sigma_k[(\|f - f_{0k}\|/f^{1/2})^{n_k} - \|f_{0k}/f^{1/2}\|^{n_k}]\}$ | $\{(n_k\ f^{1/2}k\ f_{0k})\}$ | 3K | {(8 HWHM/K [HWHM/K] × [k − ½(K + 1)])} |
| $n^{th}$-order polynomial | $\Sigma_m c_m f^m\ (c_0 \equiv 1)$ | $(c_1\ c_2\ c_3\ \ldots\ c_n)$ | n | All parameters = 0 |
| Σ of K base functions | $\Sigma_k c_k g_k(f)$ | $(c_0\ c_1\ c_2\ \ldots\ c_{k-1})$ | K − 1 | All parameter between 1/K and 1 |

As mentioned above, various techniques can be used to establish guess values in nonlinear regression. For example, in some embodiments, both $\rho$ and $\alpha$ can be initially set to zero in $V = (\rho\alpha V_\eta)$ and be iteratively refined as the regression progresses.

from which Eq. (11) can be normalized as follows:

$$\tilde{P}_s(f) = (1+\rho) \cdot \tilde{P}_{s\eta}(f) - \rho \cdot \tilde{P}_\eta(f) \leftrightarrow \tilde{P}_{s\eta}(f) = [\tilde{P}_s(f) + \rho \cdot \tilde{P}_\eta(f)]/(1+\rho), \text{ where } \rho = P_{\eta 0}/P_{s0}. \tag{14}$$

Then, using Eq. (14) to express Eq. (10) in terms of normalized spectra yields $$\Delta(f\bullet)=[(1+\rho)\tilde{P}_{sn}(f_+)-\rho\cdot\tilde{P}_n(f_+)]\cdot[(1+\rho)\tilde{P}_{sn}(f_-)-\rho\cdot\tilde{P}_n(f_-)]-\alpha^2\cdot\tilde{P}^2(f\bullet)=0, \quad (15)$$

where $\Delta(f\bullet)=\Delta(f\bullet)/P^2_0$. In Eq. (15), $\tilde{P}_{sn}(f\pm)$ and $\tilde{P}(f\bullet)$ are the experimental data, and $(\rho\alpha)$ and $\tilde{P}_n(f)$ are the unknowns.

To carry out the nonlinear regression analysis, $\tilde{P}_n(f)$ in Eq. (15) can be replaced by the model function $\hat{g}_\eta(V_\eta, f)$, where the vector $V_\eta$ represents the $N_\eta$ adjustable parameters of the model function $\hat{g}_\eta$. The adjustable parameters of the regression are $V=(\rho\alpha V_\eta)$. The experimental data $\tilde{P}_{sn}(f\pm)$ and $\tilde{P}(f\bullet)$ can be fitted using a method of successive approximations. In such a case, an initial set of parameter values for vector V is iteratively refined until a suitable match is obtained between the model and the measured data, that is, until $\Delta(f\bullet)$ in Eq. (15), as computed with the parameters $V=(\rho\alpha V_\eta)$ found by the regression, approaches zero or a predetermined value to within a specified degree of tolerance.

It is also within the scope of the present techniques for the regression to be performed iteratively. In this case, a first regression is performed using a first form of $\hat{g}_\eta$, then if the resulting difference $\Delta_0(f\bullet)$ deviates significantly from zero or from another convergence criterion, a second regression is performed with a different, generally more complex form of $\hat{g}_\eta$ selected on the basis of the result $\Delta_0(f\bullet)$ of the first regression, then a third regression on the basis of the result $\Delta_1(f\bullet)$ of the second regression, and so on, if necessary, until the result $\Delta_q(f\bullet)$ of the $(q-1)^{th}$ regression ($q^{th}$ iteration) matches or satisfies a specified criteria or degree of substantial "zeroness".

Meaning of $\rho$:

$\rho$ is a noise-to-signal ratio parameter at $f=0$, proportional to the ASE ratio $r_\eta=1/OSNR$ (see step 5 below for more details).

Meaning of $\alpha$:

$\alpha$ is a scaling factor for $\tilde{P}(f\bullet)$ that can convey information indicative of propagation effects, such as of CD and/or PMD, affecting the optical signal under test along the optical communication link. In the absence of propagation effects such as CD and PMD, it has been found from simulation results that $\alpha$ becomes substantially equal to $(1+\rho)$ or $\alpha_N\cdot(1+\rho)$, depending on whether step 2 is performed or not. Consequently, if CD and PMD can be neglected and step 2 is performed, then, in principle, $\alpha$ can be omitted as an independent adjustable parameter in Eq. (15), and be replaced by $(1+\rho)$. However, in practice, CD and PMD are rarely negligible, so that $\alpha$ generally cannot be omitted. The effect of CD and PMD is to reduce the value of the correlation term $\tilde{P}(f\bullet)$, with respect to the value given by Eqs. (4a) and (4b), by a global relative correlation factor $C_r$, referred to herein as the "relative correlation", that is substantially independent of $f\bullet$ in practice. The factor $C_r$ can be accounted for through the adjustable parameter $\alpha$. The fact that $C_r$ is substantially independent of $f\bullet$, on the one hand, and the introduction of the parameter $\alpha$ in the regression, on the other hand, can be advantageous of some implementations of the method 300. In this way, both CD and PMD can be compensated for with a single adjustable parameter, $\alpha$, and without having to be measured.

The normalized data-carrying signal spectrum, $\tilde{P}_s(f)$, can be determined from the result for $\tilde{P}_n(f)$ obtained by the regression, as follows:

$$\tilde{P}_s(f)=(1+\rho)\cdot\tilde{P}_{sn}(f)-\tilde{P}_n(f), \text{ where } \tilde{P}_n(f)=\hat{g}_\eta(V_\eta,f). \quad (16)$$

In some implementations, the error $\Delta\tilde{P}_s(f)$ on $\tilde{P}_s(f)$ as a function of the difference $\Delta\hat{g}_\eta(f)$ between the model function and the actual normalized ASE-noise spectrum can be approximated by $$\Delta\tilde{P}_s(f)\sim-r_\eta\Delta\hat{g}_\eta(f). \quad (17)$$

It is noted that if the normalized data-carrying signal power spectrum contribution $\tilde{P}_s(f)$ obtained using the present techniques is used as the reference signal-spectrum defined in U.S. Pat. No. 9,112,604 B2, Eq. (17) implies that, at worst, the relative error on the measured ASE noise ratio would be equal to some average of the relative difference $\Delta\hat{g}_\eta$.

Step 5: Computation of the OSNR

Referring still to the embodiment of FIG. 3, the method 300 can further include a step 5 of determining an OSNR from the normalized solution $\tilde{P}_s(f)$ for the data-carrying signal power spectrum contribution, the normalized solution $\tilde{P}_n(f)=\hat{g}_\eta(V_\eta, f)$ for the noise power spectrum, and the adjustable parameter $\rho$. Indeed, with the knowledge of $\tilde{P}_s(f)$, $\tilde{P}_n(f)=\hat{g}_\eta(V_\eta, f)$ and $\rho$, the OSNR may be computed according to various standard definitions. For example, from the vocabulary used in the present description, a traditional definition of the OSNR can be written as, $$r_\eta=\int_{-f_r}^{f_r}S_\eta(f)df\div\int_{-1/2B_{ch}}^{1/2B_{ch}}S_s(f)df \text{ where } r_\eta=1/OSNR \text{ (ADE-noise ratio)}. \quad (18)$$

In Eq. (18), $S_s(f)$ and $S_\eta(f)$ are the spectral densities of the data-carrying signal and ASE noise respectively, $B_{ch}$ is the width of the channel slot, and $f_r=\frac{1}{2}B_v$ where $B_v$ is the standard reference bandwidth. In some applications, the standard reference bandwidth is specified as a wavelength interval $B_\lambda=0.1$ nm. In such a case, $B_v$ is given as a function of $B_\lambda$ by $B_v\cdot(c/\lambda_i^2)$, where $\lambda_i$ is the center wavelength of the $i^{th}$ channel, and c is the speed of light. According to this definition, the ASE-noise ratio and OSNR can be computed from the measured normalized spectra as follows, $$r_\eta=\rho\cdot\int_{-f_r}^{f_r}\tilde{P}_\eta(f)df\div\int_{-1/2B_{ch}}^{1/2B_{ch}}\tilde{P}_s(f)df \text{ } OSNR_{dB}=-10\log(r_\eta), \quad (19)$$

where $OSNR_{dB}$ is the OSNR expressed in dB, that is, $OSNR_{dB}=10\log(OSNR)$. It is noted that Eq. (19) assumes that the window $w(f)$ is narrow enough in the sense that, $$\int_{-1/2B_{ch}}^{1/2B_{ch}}\tilde{P}_s(f)df\approx\int_{-1/2B_{ch}}^{1/2B_{ch}}\check{S}_s(f)df \text{ and, } \int_{-f_r}^{f_r}\tilde{P}_\eta(f)df\approx\int_{-f_r}^{f_r}\check{S}_\eta(f)df, \quad (20)$$

where $\check{S}_s(f)$ and $\check{S}_\eta(f)$ are the normalized spectral densities of the signal and ASE noise, respectively. Since a narrow $w(f)$ is typically used (e.g., 50-500 MHz), the two approximate equalities in Eq. (20) are generally accurate in practice.

System Implementations

In accordance with another aspect, there is provided a system or apparatus for spectrally characterizing an optical signal propagating along an optical communication link and capable of implementing the methods described herein. As will be described in greater detail below, some system and apparatus implementations described herein can use what is referred to herein as a "low-frequency beatnote" (LFB) approach. In the LFB approach, the spectral correlation function within pairs of spectral components spectrally separated by the symbol frequency in the optical signal under test is determined from a LFB amplitude function whose measurement can involve bringing the spectral components of each pair spectrally closer together and measuring a low-frequency beatnote therebetween.

Figure 4:
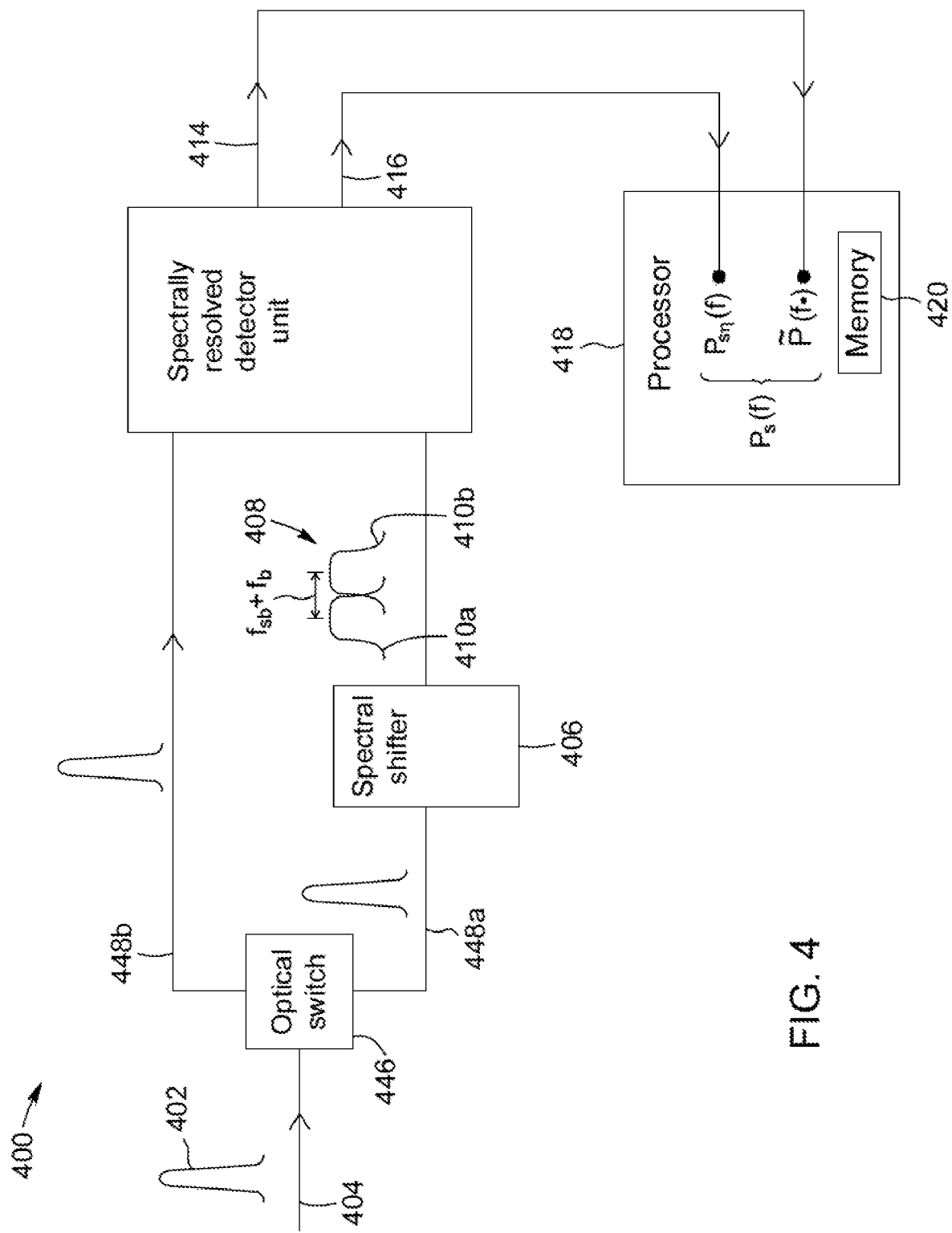
FIG. 4 is a schematic block diagram of a system for spectrally characterizing an optical signal propagating along an optical communication link, in accordance with a possible embodiment.

Referring to FIG. 4, there is provided a schematic block diagram of an exemplary embodiment of a system 400 for spectrally characterizing an optical signal 402 propagating along an optical communication link 404, for example an optical fiber. The optical signal 402 includes a data-carrying signal contribution modulated at a symbol frequency within a data-carrying signal bandwidth and a noise contribution.

The system 400 includes a spectral shifter 406 configured to generate, in a first acquisition mode, a double-sideband signal 408 from the optical signal. The double-sideband signal 408 includes a first image signal 410a and a second image signal 410b. The first and second image signals 410a, 410b represent sideband images of the optical signal 402 that separated from each other by a spectral shift $2\delta_{\leftrightarrow}$ equal to the symbol frequency $f_{sb}$ plus or minus a beatnote frequency $f_b$, the case $2\delta_{\leftrightarrow}=(f_{sb}+f_b)$ being represented in FIG. 4. The beatnote frequency $f_b$ is lower than the symbol frequency $f_{sb}$, for example by a ratio ranging from $10^3$ to $10^6$ in some implementations, and more particularly from $10^4$ to $10^5$. The spectral shifter 406 is either bypassed by, or inoperative, the optical signal 402 in a second acquisition mode. In the former scenario, the system 400 can include an optical switch 446 for, in the first acquisition mode, directing the optical signal 402 along a first path 448a including the spectral shifter 406, and, in the second acquisition mode, directing the optical signal 402 along a second path 448b that bypasses the spectral shifter 406. In some implementations, instead of an optical switch 446, the spectral-shifting capabilities of the spectral shifter 406 may be selectively turned on and off respectively in the first and second acquisition modes.

The system 400 also includes a spectrally resolved detector unit 412 operable within a spectral range in the data-carrying signal bandwidth. The spectrally resolved detector unit 412 is configured to, in the first acquisition mode, detect and spectrally resolve the double-sideband signal 408 and output a first detected signal 414, and, in the second acquisition mode, detect and spectrally resolve the optical signal 402 and output a second detected signal 416. Because of the provision of the optical switch 446, the optical signal 402 and the double-sideband signal 408 in the illustrated embodiment are detected one at a time and independently from each other. However, in other embodiments, it could be envisioned that the optical signal 402 and the combined optical signal 408 be detected at least partly concurrently, for example if the spectrally resolved detector unit includes multiple detectors and/or delay lines.

In the present description, the term "spectrally resolved detector unit" broadly refers to any optical detector or receiver, or combination of optical detectors, capable of measuring a spectrally dependent response (e.g., as a function of frequency or wavelength over a certain spectral range) of an input signal. The or each optical detector in the spectrally resolved detector unit 412 generally operates as an opto-electrical receiver configured for receiving an input signal and for outputting an electrical signal representing the received input signal. The electrical signal can be sampled and digitized as spectral data representative of the detected input signal. The spectrally resolved detector unit 412 can be embodied by, or be part of, different types of spectrally sensitive detectors, including optical spectrum analyzers (OSAs), swept-wavelength systems or any other type of spectral measurement devices. In some implementations, the spectrally resolved detector unit 412 can be a high-resolution OSA, non-limiting examples of which can include a heterodyne OSA, a coherent OSA, a Brillouin OSA and a coherent receiver.

The system 400 further includes a processor 418 coupled to the spectrally resolved detector unit 412. The processor 418 is configured to receive, after analog-to-digital conversion, the first and second detected signals 414, 416, and to deriving therefrom spectral information about the double-sideband signal 408 and the optical signal 402, respectively.

In the present description, the term "processor" refers to an entity that controls and executes, at least in part, the operation of the system 400. The processor 418 can be provided within one or more general purpose computers and/or within any other dedicated computing devices. It should be noted that the term "processor" should not be construed as being limited to a single processor, and accordingly any known processor architecture may be used. The processor 418 can be implemented in hardware, software, firmware, or any combination thereof, and be connected to various components of the system 400 via appropriate communication links and ports. The processor 418 may be embodied by a computer, a microprocessor, a microcontroller, a central processing unit (CPU), a programmable logic device such as, for example, a field-programmable gate array (FPGA), or any other type of processing resource or any combination of such processing resources configured to operate collectively as a processor. The processor 418 may include or be coupled to one or more memory elements 420 capable of storing computer programs and other data to be retrieved by the processor 418. Each memory element 420 can also be referred to as a "computer-readable storage medium". Depending on the application, the processor 418 may be integrated, partially integrated or physically separate from the optical hardware of the system 400, including, but not limited to, the spectral shifter 406 and the spectrally resolved detector unit 412.

In FIG. 4, the processor 418 is configured to receive the second detected signal 416 and to identify it as, or determine therefrom, an optical power spectrum $P_{sn}(f)$ of the optical signal 402. As mentioned above, the optical power spectrum $P_{sn}(f)$ includes a data-carrying signal power spectrum contribution Ps(f) and a noise power spectrum contribution $P_n(f)$, which are not discriminated from each other.

The processor 418 is also configured to determine a spectral correlation function $\tilde{P}(f\bullet)$ for a set of pairs of spectral components of the optical signal 402, the set of pairs being respectively centered on a corresponding set of center frequencies f• over a center frequency range within the spectral range. The spectral components in each pair are spectrally separated from each other by the symbol frequency $f_{sb}$. In the embodiment of FIG. 4, the spectral correlation function $\tilde{P}(f\bullet)$ is obtained by determining, based on first detected signal 414, a beatnote amplitude function for a set of pairs of beating components. The pairs of beating components are respectively associated with the pairs of spectral components in the optical signal 402. The beating components of each pair are spectrally separated from each other by the beatnote frequency $f_b$, such that one beating component is associated with the first image signal 410a and the other is associated with the second image signal 410b of the double-sideband signal 408. The beatnote amplitude function relates, within the spectral range, a beatnote amplitude between the beating components of each pair as a function of the center frequency of its associated pair of spectral components.

Once the optical power spectrum $P_{sn}(f)$ and the spectral correlation function $\tilde{P}(f\bullet)$ have been determined as measured data, the processor 418 can be configured to obtain a solution representing the data-carrying signal power spectrum contribution $P_s(f)$, such that a calculated spectral correlation computed based on the solution and in view of the measured optical power spectrum $P_{s\eta}(f)$ matches the measured spectral correlation function $\tilde{P}(f\bullet)$. This step can be carried out such as described, for example by using a nonlinear regression analysis.

It is to be noted that in some implementations, the processing steps described above may, but need not, be performed by the same physical processor. For example, it may be envisioned to determine the spectral correlation function $\tilde{P}(f\bullet)$ and the optical power spectrum $P_{s\eta}(f)$ based on the first and second detected signals 414, 416, respectively, using a processor included in the spectrally resolved detector unit 412, and to obtain the solution representing the data-carrying signal power spectrum contribution $P_s(f)$ with another processor, separate from the optical hardware of the system 400.

More detail regarding the structure, configuration and operation of these and other possible components and features of the system according to the present techniques will be described in greater detail below.

Figure 5:
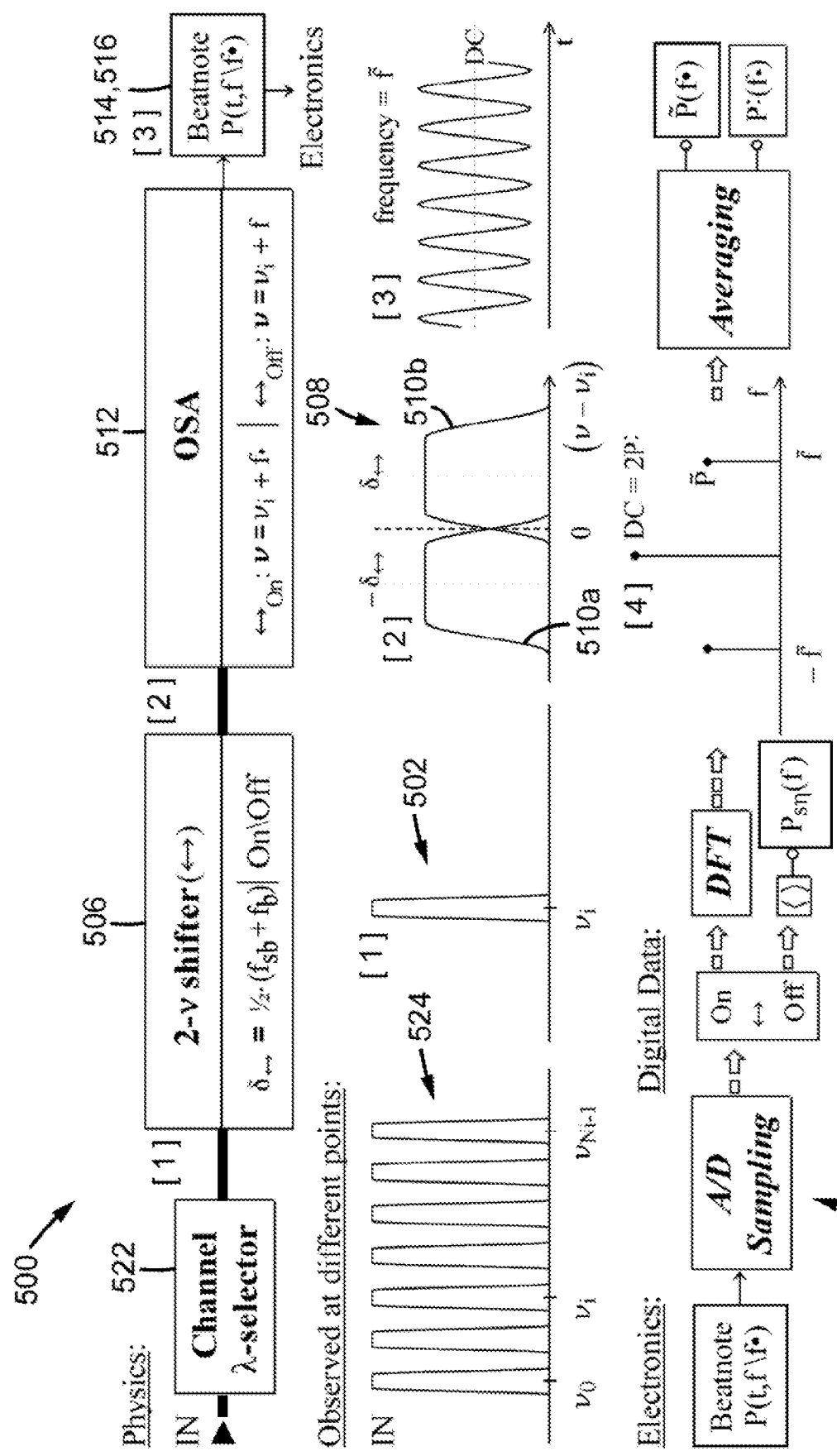
FIG. 5 is a schematic representation illustrating operating principles and information flow of a system for spectrally characterizing an optical signal propagating along an optical communication link, in accordance with another possible embodiment.

Referring to FIG. 5, there is provided a schematic representation of operating principles and information flow of another exemplary embodiment of a system 500 for spectrally characterizing an optical signal propagating along an optical communication link. The system 500 in FIG. 5 generally includes an optical channel λ-selector 522, a 2-ν shifter 506, an optical spectrum analyzer (OSA) 512 and a processor 518. Before describing the general principle of operation of the system 500 as such, the functions of the channel λ-selector 522, the 2-ν shifter 506 and the OSA 512 will be presented.

The channel λ-selector 522 is configured to receive (at point "IN" in FIG. 5) lightwave 524 from an optical communication system (not shown), typically including $N_i$ wavelength (λ)-multiplexed channels, i=0 ... ($N_i$–1), $N_i$=1 ... ∞. For example, in some exemplary embodiments, $N_i$ can be of the order of 10 to 100. The optical frequency $\nu_i$ is the carrier frequency ($\nu_i$=c/$\lambda_i$) of channel i. In FIG. 5, optical, electrical and digital signals are shown with thick solid lines, thin solid lines and dashed lines, respectively.

The function of the channel λ-selector 522 is to filter out a given channel i from all the other channels, as illustrated by the spectra IN and [1]. In some implementations, the measurements are performed sequentially, channel by channel: the signal spectrum of a first channel i is measured; then a second channel is selected, and its signal spectrum measured; then a third channel is selected, and so on. Depending on the application, the channel λ-selector 522 may be embodied by a tunable filter, an array of fixed-filters with optical switches, a wavelength-division multiplexing (WDM) demultiplexer, or any other commonly available device that can perform or be configured to perform the function described above.

It is to be noted that with respect to the terminology used herein, each one of the N optical channels can be said to contain an optical signal 502 to be spectrally characterized. As such, the optical channel selector 522 is configured to select the currently characterized optical signal 502 from a selected one of a plurality of spaced-apart optical channels $N_i$. The optical signal 502 in a selected channel can therefore be described as including two contributions, namely a data-carrying signal contribution modulated at a symbol frequency $f_{sb}$ within a data-carrying signal bandwidth corresponding to spectral width of the selected channel, and a noise contribution that typically includes ASE noise. The optical signal 502 in a selected channel also has an optical power spectrum $P_{s\eta}(f)$ including a data-carrying signal power spectrum contribution $P_s(f)$ associated with the data-carrying signal contribution and a noise power spectrum contribution $P_\eta(f)$ associated with the noise contribution.

Figure 6:
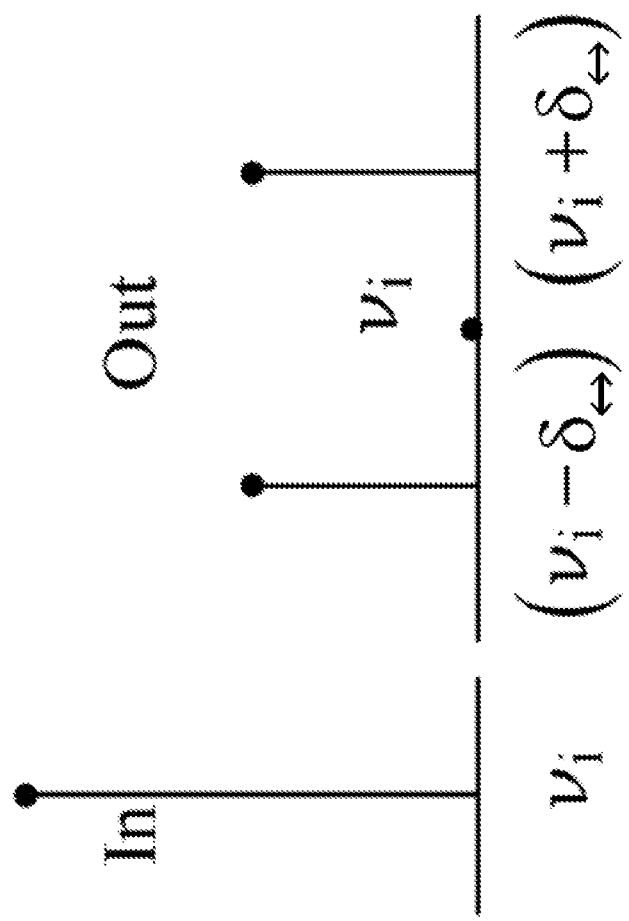
FIG. 6 is a schematic representation of the input and output signals of a 2-ν shifter such as the one in the system of FIG. 5.

The LFB approach introduced above can be implemented based on the function provided by the 2-ν shifter 506, which corresponds to the spectral shifter 406 of the embodiment of FIG. 4. In FIG. 5, the function of the 2-ν shifter 506 is to generate two images 510a, 510b of spectrum [1], the two images 510a, 510b being respectively shifted from the original by $\pm\delta_{\leftrightarrow}$, where $\delta_{\leftrightarrow}=\frac{1}{2}(f_{sb}+f_b)$ or $\frac{1}{2}\frac{1}{2}(f_{sb}-f_b)$, and $f_b$ is the frequency of the beatnote observed at further points (graphs [3], [4]). The case $\delta_{\leftrightarrow}=\frac{1}{2}(f_{sb}+f_b)$ is shown in FIG. 5. Referring briefly to FIG. 6, the input of the 2-ν shifter can be a narrow tone from a laser at frequency $\nu_i$. Then, the function of the 2-ν shifter is to generate two tones from this single tone, at frequencies $(\nu_i+\delta_{\leftrightarrow})$ and $(\nu_i-\delta_{\leftrightarrow})$, with the original tone at $\nu_i$ substantially suppressed. Returning to FIG. 5, when the input of the 2-ν shifter 506 has an arbitrary spectrum (e.g., sum of spectral components), each spectral component is similarly imaged as two symmetrically shifted spectral components. Since this is a linear transformation, the output 508 consists of two images 510a, 510b of the input spectrum that are identical in shape to the input image, but reduced in amplitude and spectrally shifted by $+\delta_{\leftrightarrow}$ and $-\delta_{\leftrightarrow}$ as shown by graph [2] in FIG. 5. Preferably, the original spectrum at $\nu_i$ and possible unintended images at $(\nu_i \pm 2\delta_{\leftrightarrow})$ are substantially suppressed. For example, this suppression can be achieved by a properly set electro-optical modulator, or the like.

The system 500 of FIG. 5 also includes an OSA 512, which is a possible embodiment of the spectrally resolved detector unit 412 of FIG. 4. It is to be noted that an OSA is a common device whose operating principles are generally well known in the art and need not be covered in detail herein. In the embodiment of FIG. 5, one function of the OSA 512 is to operate as a tunable, narrowband optical filter followed by a photodetector whose output is substantially proportional to the power of the lightwave incident thereonto. The output of the photodetector is generally an electrical signal, for example a photo-current or corresponding voltage, but can be any physical quantity that can be sampled and converted to digital data in a subsequent step. It is to be noted that OSA 512 in FIG. 5 can provide a physical implementation of the conceptual window w(f) defined above. Therefore, any feature discussed herein with respect to w(f) can, in principle, be applied to the OSA 512 in FIG. 5. In the present description, the term "tunable OSA" means that the optical frequency ν around which the window w(f=ν−$\nu_i$) is centered can take a plurality of values within a range that substantially encompasses the spectral slot allocated to the channel i under measurement. Furthermore, the term "narrowband OSA" refers to the width of the parameter commonly referred to as the resolution bandwidth (RBW), which corresponds herein to the equivalent noise bandwidth $B_w$, of $w^2(f)$ defined above. Therefore, the requirements on the RBW, if any, are generally those on $B_w$. In practice, it is often preferable that $B_w \ll f_{sb}$, and $B_w$ is expected to lie in a range from a few tens to a few hundreds of MHz (see below).

The principles of the LFB approach may be more easily understood if presented first from an alternative point of view in which there would be no 2-ν shifter and no channel λ-selector. Instead, the incoming lightwave 524 at IN in FIG. 5 would be split into a first and a second lightwave that would be sent respectively to a first and a second narrowband optical filter having windows w(f) with $B_w \ll f_{sb}$, centered on $(\nu_i+\frac{1}{2}f_{sb})$ and $(\nu_i-\frac{1}{2}f_{sb})$, respectively. The output lightwaves of the first and second optical filters would be recombined, and the resulting lightwave would be sent to a fast photodetector. As there would be a range of spectral components selected respectively by the first and second filters that are pairs of correlated spectral components separated by $f_{sb}$, the following would be observed in the photodetector output i(t) instead of the wideband noise that would be seen if there were no such correlation: (a) in the time domain, a low-noise sine wave if i(t) is adequately bandpass-filtered; and (b) in the frequency domain, large tones at frequencies $\pm\frac{1}{2}f_{sb}$ over a comparatively very small-amplitude wideband noise background (width~$B_w$). In other words, a coherent beatnote of frequency $f_{sb}$ would be observed. An important fact for some embodiments described herein is that the amplitude of this beatnote would yield the spectral correlation term $\tilde{P}$ given by Eqs. (4a) and (4b).

In contrast, in the LFB approach depicted in the embodiment of FIG. 5, the two correlated spectral components ($f_+$, $f_-$) of all such pairs are first brought very close to each other in the frequency domain by the action of the 2-v shifter 506 to form a double-sideband signal 508 resulting from the superposition of two image signals 510a, 510b. In the spectrum at point [2], the correlated spectral components of each of such pairs are now spectrally spaced-apart by $f_b$ instead of $f_{sb}$. If $f_b$ is set much smaller than $B_w$, the output of the OSA 512 is equivalent to the beatnote as described in the previous paragraph, except that the beatnote frequency is now $f_b$ instead of $f_{sb}$, hence the term "low-frequency" to designate this beatnote. The amplitude of this beatnote is also equivalent to the spectral correlation function $\tilde{P}$ defined by Eqs. (4a) and (4b), which is a parameter to be measured, or determined from measurement, in embodiments described herein.

In current fiber-optic systems, the symbol frequency $f_{sb}$ can be up to 25 GHz and more. On the other hand, $B_w$ can be expected to lie in the range from a few tens to a few hundreds of MHz, so indeed $B_w \ll f_{sb}$ is generally satisfied. Accordingly, a value of a few hundreds of kHz to about 2 MHz should generally be both large enough and a judicious setting for the beat frequency $f_b$, so that the inequalities $f_b \ll B_w \ll f_{sb}$ are satisfied. Therefore, considering what would be a typical case with $f_{sb}$=25 GHz and $f_b$=1 MHz, $f_b$ is indeed a very low frequency compared to $f_{sb}$.

For further digital processing the output of the photodetector, the beatnote P(t, f\f•), is sampled and converted to digital data. For this purpose, the system 500 of FIG. 5 can include an analog-to-digital (A/D) converter 526. Since the beat frequency $f_b$ is low in the LFB approach, there is generally no need for a high-speed A/D converter. In good sampling practice, a lowpass filter with cutoff frequency $f_c \leq f_e$ can be applied to the analog signal before sampling at a rate $f_e$. Then, in principle, the minimal condition for the sampling rate is $f_e \geq f_b$, or even smaller if an under-sampling approach is used. However, to make room in the frequency domain for possible phase and/or amplitude fluctuations of the beatnote, it may be considered for $f_e$ to be somewhat larger than prescribed by this minimal condition. In practice, and without limitation, a value $f_e$~$2f_b$ can be expected to be safely large enough and a judicious general setting of the sampling rate.

Referring still to FIG. 5, the digital data output by the A/D converter 526 is received by the processor 518. Once the digital data has been received by the processor 518, the subsequent data processing depends on whether the 2-v shifter 506 is put on (first acquisition mode) or off (second acquisition mode). Turning the 2-v shifter 506 alternately on and off is a simple and convenient way of depicting the principle. It can be as such literally, but in more general terms, the term "shifter-off" means that the optical signal 502 at point [1] is sent to the input of the OSA 512 (point [2]) without undergoing any spectral shifting or other special transformation. Any appropriate means of achieving this purpose can be used, putting the function of the 2-v shifter 506 off is one simple way. For example, some embodiments may include an optical switch to bypass the 2-v shifter 506 altogether, thus sending the signal at point [1] directly to point [2], as in FIG. 4. As a result, the OSA 512 will receive the double-sideband signal 508 in a first acquisition mode, generally corresponding to a first acquisition time, and the optical signal 502 without transformation in a second acquisition mode, generally corresponding to a second acquisition time. As such, the optical signal 502 and the double-sideband signal 508 can be detected and spectrally resolved independently from each other.

Shifter-Off:

When the 2-v shifter 506 is put off or bypassed (second acquisition mode), the mean value of P(t, f) over an acquisition time Δt constitutes the measurement of the optical power spectrum $P_{sn}$(f) of the optical signal 502. In this case, no specific processing is required. That is, the processor 518 can receive spectral data 516 corresponding to the detected optical signal 502 and simply identify or determine that this spectral data 516 represent $P_{sn}$(f). In some implementations, $P_{sn}$(f) may be averaged by the processor 518 over a number K of acquisitions.

Shifter-on:

When the 2-v shifter 506 is put on (first acquisition mode), the square modulus of the DFT of the sampled beatnote 514, P(t), can be computed as $$S(f) = |DFT[P(t)]|^2. \qquad (21)$$

In general, S(f) exhibits three large narrow peaks or tones over a comparatively small, wideband background as schematically depicted by graph [4] in FIG. 5, where actually $S^{1/2}(f) = |DFT[P(t)]|$ is plotted. The measured value of the correlation term $\tilde{P}^2(f•)$ is given by the value of the large narrow peaks at $f = \pm f_b$, and the measured value of the DC term $\tilde{P}'^2(f•)$ is given by the value of the large peak at f=0. In mathematical terms, this can be expressed as follows:

$$\tilde{P}^2(f•) = \frac{1}{2}[S(f_b) + S(-f_b)], \qquad (22)$$

$$\tilde{P}'^2(f•) = \frac{1}{4}S(0). \qquad (23)$$

In some implementations, the above procedure can be done K times while keeping the same value of f or f• either when the 2-v shifter 506 is on (f•) or off (f). For example, when the 2-v shifter 506 is on, the measured value $\tilde{P}^2_k$ obtained according to Eq. (22) is stored in memory at each iteration k, k=0 . . . (K−1), and the averaged result is computed as $\tilde{P}^2(f•) = (1/K) \Sigma_k \tilde{P}^2_k$. Alternatively, averaging can be performed through an accumulated sum, that is, a first value $\tilde{P}^2_0$ is measured and stored in memory as first sum $\Sigma^{(0)}$, then a second value $\tilde{P}^2_1$ is measured and added to first sum to obtain second sum $\Sigma^{(1)} = \Sigma^{(0)} + \tilde{P}^2_1$, then a third value $\tilde{P}^2_2$ is measured and added to second sum to obtain third sum $\Sigma^{(2)} = \Sigma^{(1)} + \tilde{P}^2_2$, and so on, computing sum k at each iteration as $\Sigma^{(k)} = \Sigma^{(k-1)} + \tilde{P}^2_k$, the averaged result being obtained as $\tilde{P}^2(f•) = (1/K) \Sigma^{(K-1)}$. Yet another alternative is averaging the whole curves $S_k(f)$ instead of the single values $\tilde{P}^2_k$; the procedure is the same as described above, just by replacing $\tilde{P}^2_k$ by $S_k(f)$. Then $\tilde{P}^2$ is computed according to Eq. (22) from the averaged S(f). An advantage of this last alternative is that an eventually non-negligible background of additive noise (electronics) may be determined and subtracted with greater accuracy. In some embodiments, $\tilde{P}^{:2}$ may also be averaged along with $\tilde{P}^2$, using a procedure that may correspond to any of the above alternatives, and likewise for $P_{s_\eta}(f)$ when the 2-v shifter 506 is off.

As per the above discussion regarding step 0 and Eq. (7), the duration $\Delta t$ of the sampled beatnote, from which $S(f)$ is computed, may be selected such that $B_{eq} \cdot \Delta t \gg 1$. When averaging is performed as described above, the relevant $\Delta t$ to be put in Eq. (7) becomes the acquisition time of individual iterations, rather than the total acquisition time $K \cdot \Delta t$. Therefore, unless for other practical reasons (see, e.g., the exemplary embodiment of FIGS. 7A and 7B below), it is often preferable to perform a single acquisition (iteration k=0), with an acquisition time $\Delta t = K \cdot \delta t$ rather than averaging over K acquisitions with individual acquisition times $\delta t$.

Figure 7A:
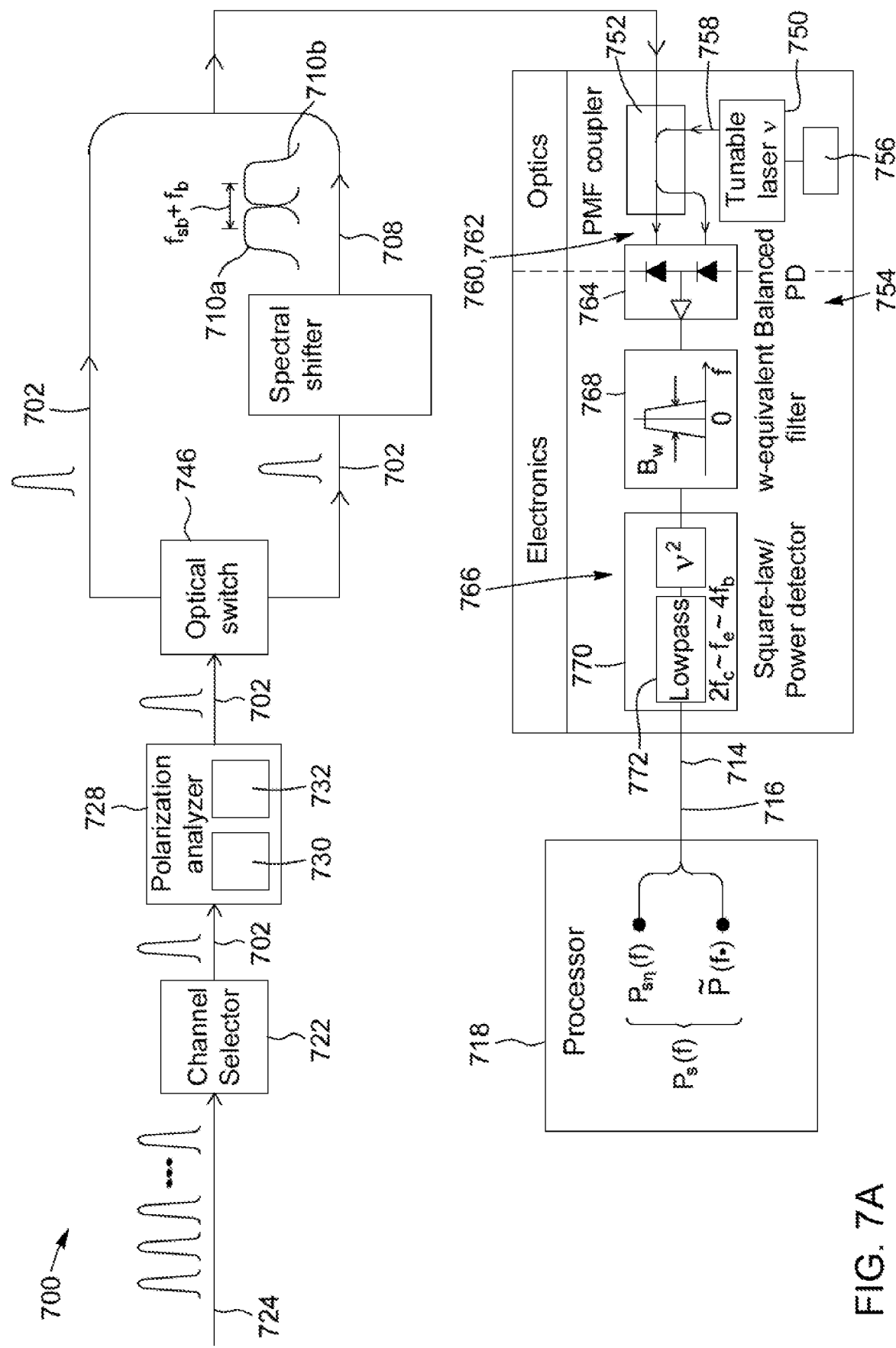
FIG. 7A is a schematic block diagram of a system for spectrally characterizing an optical signal propagating along an optical communication link, in accordance with another possible embodiment.
Figure 7B:
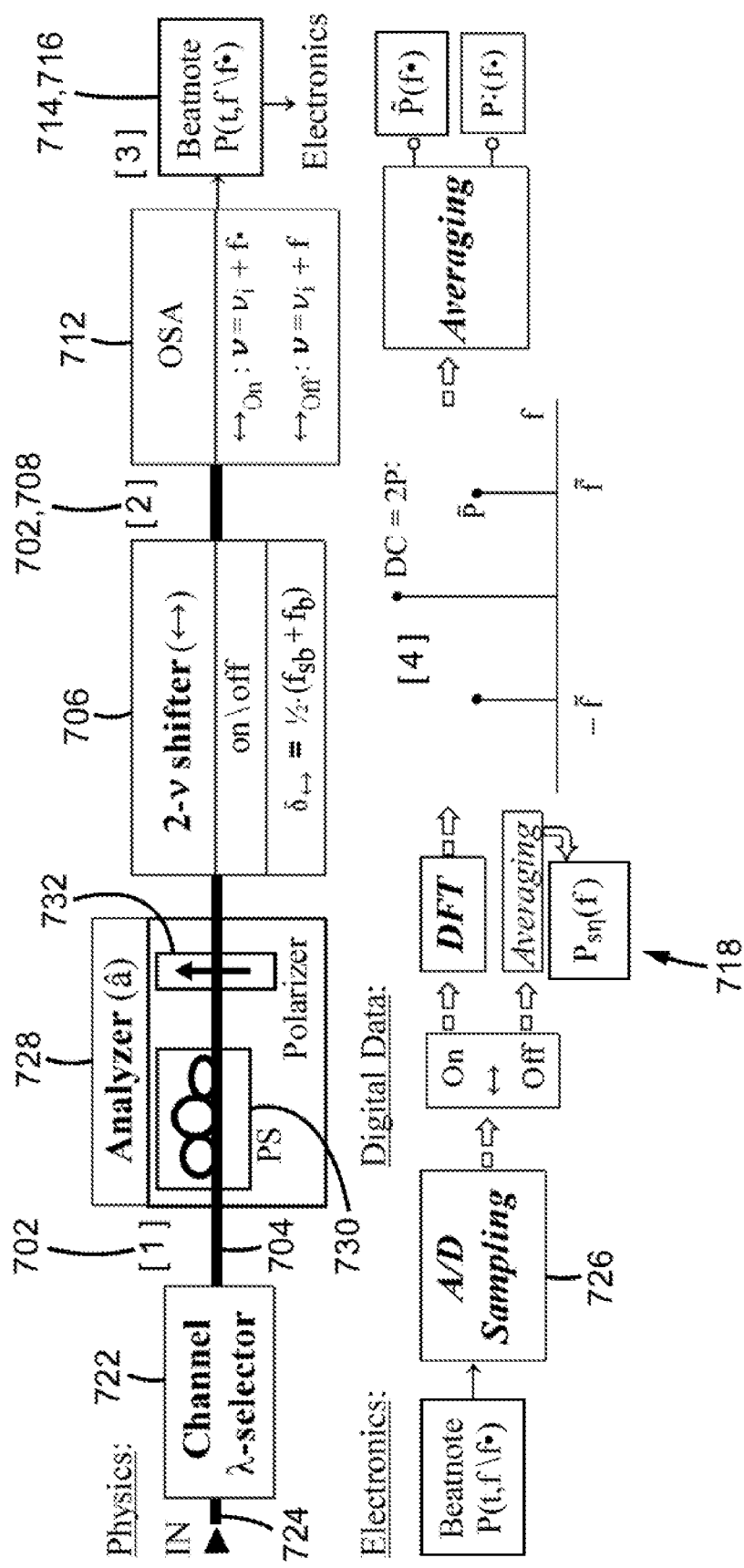
FIG. 7B is a schematic representation illustrating operating principles and information flow of the embodiment of FIG. 7A.

Reference is now made to FIGS. 7A and 7B. FIG. 7A is a schematic block diagram of another exemplary embodiment of a system 700 for spectrally characterizing an optical signal 702 propagating along an optical communication link 704. FIG. 7B is a schematic representation of operating principles and information flow of the embodiment of FIG. 7A. The embodiment of FIGS. 7A and 7B shares several features with the embodiments of FIGS. 4 and 5, which will not be described again in detail other than to highlight possible differences and variants. However, it differs mainly in that it includes a polarization analyzer 728, whose purpose and operation will be described below.

It is to be noted that if the measurements of $\tilde{P}(f\bullet)$ were performed strictly such as described above with reference to the embodiments of FIGS. 4 and 5, the relative correlation $C_r$ (see step 4 of the method 300 of FIG. 3 discussed above) that the adjustable parameter $\alpha$ of the regression aims to compensate may become impracticably small in some instances where the PMD along the optical communication link 704 becomes greater than a certain value $PMD_{sb}$. When $PMD \geq PMD_{sb}$ the spectral correlation function $\tilde{P}(f\bullet)$ may sometimes be so small as to be lost in the additive noise. Also, two spectral components separated by the symbol frequency $f_{sb}$, which in the absence of PMD would have the same polarization state and be correlated, may become mutually orthogonally polarized and see their spectral correlation vanish or be significantly reduced above a certain PMD level. Furthermore, for PM systems in which the synchronization between two symbol sequences happens to be offset by $\frac{1}{2}T_s b = 1/(2f_{sb})$, in the absence of PMD, the observed correlation term vanishes completely if the two powers are equal. That is, the two beatnotes originating respectively from the signals with state of polarizations $\hat{s}_o$ and $-\hat{s}_o$ are out of phase, and thus cancel each other out if their amplitudes are equal. The provision of a polarization analyzer 728 in FIGS. 7A and 7B aims to eliminate or at least reduce these potential issues.

In the present embodiment, the polarization analyzer 728 is located before the 2-v spectral shifter 706 in FIGS. 7A and 7B, but could, in principle, be located at any point upstream of the spectrally resolved detector unit 712, for example after the 2-v spectral shifter 706. The polarization analyzer 728 can include a polarization scrambler 730 and be followed by a polarizer 732. The polarization scrambler 730 is configured to change, generally periodically and randomly, a polarization state of the optical signal 702 with time. This time-variation of the polarization state is generally performed in a manner that is substantially independent of frequency within the bandwidth of the optical signal 702. In such a case, the polarization scrambler 730 will vary the absolute, but not the relative, polarization states of individual spectral components of the optical signal 702. The polarizer 732 is configured to receive and pass a fixed polarization component of the time-varying polarization-scrambled optical signal produced by the polarization scrambler 730 and to pass a fixed polarization component thereof. By combining the functions of the polarization scrambler 730 and the polarizer 732, the polarization analyzer 728 in FIGS. 7A and 7B can allow the optical power spectrum $P_{s_\eta}(f)$ and the spectral correlation function $\tilde{P}(f\bullet)$ to be determined and averaged over a plurality of polarization states of the optical signal 702, and potential adverse effects of PMD to be controlled or mitigated.

The time-varying polarization state selected by the polarization analyzer 728 can be represented by a three-dimensional normalized Stokes vector $\hat{a}$ ($\hat{a} \cdot \hat{a} = 1$), which can be viewed as the position of a point on the surface of a unit sphere, known as the Poincaré sphere. In some implementations, it may be desirable, or required, that the polarization scrambling performed by the polarization scrambler 730 be such that the vector $\hat{a}$ can reach any point on the surface of the Poincaré sphere, so as to cover approximately its entire surface over a measurement period, preferably uniformly (e.g., uniform random scrambling). However, it has been found that in many cases, the uniformity condition is readily fulfilled, as it is generally sufficient $\hat{a}$ can reach at least one point in each of the eight octants of the Poincaré sphere. More particularly, it is also generally best avoided to have all possible values of $\hat{a}$ concentrated around only one or two points on the sphere.

In some embodiments, to randomize the axis $\hat{a}$ of the polarization scrambler 730 to get meaningful mean-values by averaging over K random polarization state settings corresponding to K random settings of $\hat{a}$, it is often preferred to perform the averaging from K acquisitions with acquisition time $\Delta t$, so that $\hat{a}$ is changed between each iteration, instead of performing a single acquisition with acquisition time $K \cdot \Delta t$. In this way, a desirable random scrambling of a can be performed without increasing the overall measurement time. Of course, some embodiments may use different acquisition schemes without departing from the scope of the present techniques. In some implementations, it has been found that only a few different settings of $\hat{a}$ can be sufficient to avoid vanishing values of Cr, and that for physical interpretation purposes, meaningful mean values can already be obtained with K=10. Furthermore, it has also been found that a value of K=100 can be a reasonable and adequate default value in some applications.

Figure 8:
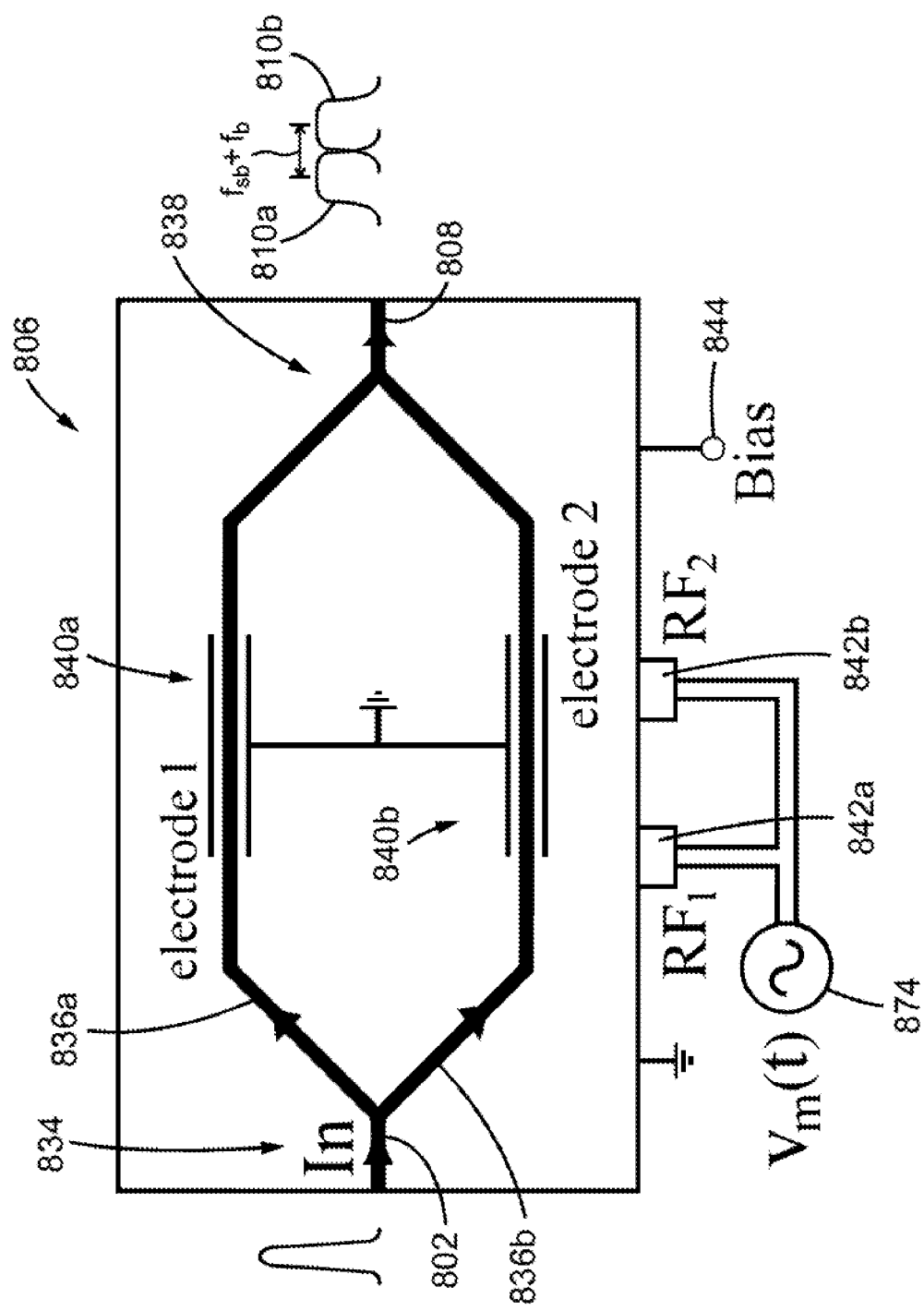
FIG. 8 is a schematic representation of the configuration of a possible implementation of a 2-ν spectral shifter for use in an embodiment of a system for spectrally characterizing an optical signal propagating along an optical communication link.

Referring now to FIG. 8, there is provided a schematic representation of the configuration of an example of a 2-v spectral shifter 806 that can be used in the system embodiments described herein and illustrated in the figures. In FIG. 8, the 2-v spectral shifter 806 is embodied by an electro-optic modulator, more particularly a double drive Mach-Zehnder (DDMZ) electro-optic interferometer set as an amplitude modulator. A non-limiting example of a commercially available DDMZ electro-optic modulator is the LN05S-FC Intensity Modulator manufactured by Thorlabs. In some embodiments, the use of a DDMZ amplitude modulator can decrease cost and complexity. Of course, in other embodiments, the 2-v spectral shifter may be embodied by other types of Mach-Zehnder or electro-optical modulators, or other suitable types of modulators and optical devices.

In FIG. 8, the optical signal 802 at the input 834 of the DDMZ spectral shifter 806 is split evenly between the first arm 836a and the second arm 836b of the DDMZ spectral shifter 806 and is recombined at the output 838 as a double-sideband signal 808 made of two sideband image signals 810a, 810b. The first and second arms 836a, 836b induce phase shifts $\varphi_1$ and $\varphi_2$ through application of a voltage to first and second electrodes 840a, 840b, respectively. The voltage $v_m(t)$ applied by a source to the first and second arms 836a, 836b via first and second RF inputs 842a, 842b can be a sinewave modulation voltage of frequency $f_m$. The modulation frequency $f_m$ is the equivalent of the shift $\delta_{\leftrightarrow}$ discussed above, so that $f_m = \frac{1}{2}(f_{sb}+f_b)$ or $\frac{1}{2}(f_{sb}-f_b)$. The bias input 844 is a constant voltage added to one of the two electrodes 840a, 840b to finely tune the operating point, that is, the phase difference $(\varphi_2-\varphi_1)$ when both RF inputs 842a, 842b are zero. In FIG. 8, the operating point is set to $(\varphi_2-\varphi_1)=\pi$, so that the amplitude of the output lightwave 808 is zero when both RF inputs are zero. Defining $v_\pi$, as the voltage inducing a $\pi$ phase-shift, the modulation voltage can be written as $$v_m(t)=(\Delta\varphi/\pi)\cdot v_\pi \cos(\omega_m t), \text{ with } \Delta\varphi=\operatorname{asin}(\Delta A) \text{ and } \omega_m=2\pi f_m, \quad (24)$$

where $\Delta A$ is the modulation depth of the amplitude. In this configuration, a 100% modulation depth ($\Delta A=1$) can be achieved, corresponding to a phase swing $\Delta\varphi=\pi/2$, but then non-negligible odd harmonics at $\pm 3f_m$ are generated in the Fourier transform of the output lightwave 808, instead of only the two desired images 810a, 810b at $\pm f_m$. The amplitude $c_3$ of the third harmonic relative to the amplitude $c_1$ of the fundamental at $f_m$ is then $r_3=c_3/c_1=0.122$. In some cases, if not accounted for, such value of the relative amplitude $r_3$ of the spurious image could lead to non-negligible measurement errors. In some embodiments, two solutions can be combined to overcome or at least alleviate the effect of the third harmonic: a) reducing the modulation depth $\Delta A$, thus reducing $r_3$ accordingly, the downside being an equivalent overall power loss, as if the power of the input lightwave were smaller; and b) taking the non-negligible third harmonic—and other harmonics, if required—into account in the nonlinear regression analysis described above.

In some implementations, it may be envisioned to deal with such spurious images, provided that the relative amplitudes $r_q$ of the harmonics $|q|=2 \ldots q_+$ in question are reasonably well known. Instead of Eq. (15), a somewhat more complex expression of the difference $\Delta(f\bullet)$ to be minimized could be used, where the contribution $\Delta\tilde{P}_h(f\bullet)$ of the spurious harmonics to the correlation term would be considered, although the overall analysis would remain essentially the same. For completeness, the contribution of the spurious harmonics to the correlation term may be written as $$\Delta\tilde{P}h(f\bullet)=\Sigma_{q=[2,q_+]}[r_q r_{q-2}\tilde{P}(f\bullet-(q-1)f_{sb}/2)+r_{-q}r_{-q+2}\tilde{P}(f\bullet+(q-1)f_{sb}/2)]. \quad (25)$$

Figures 9A, 9B, 9C:
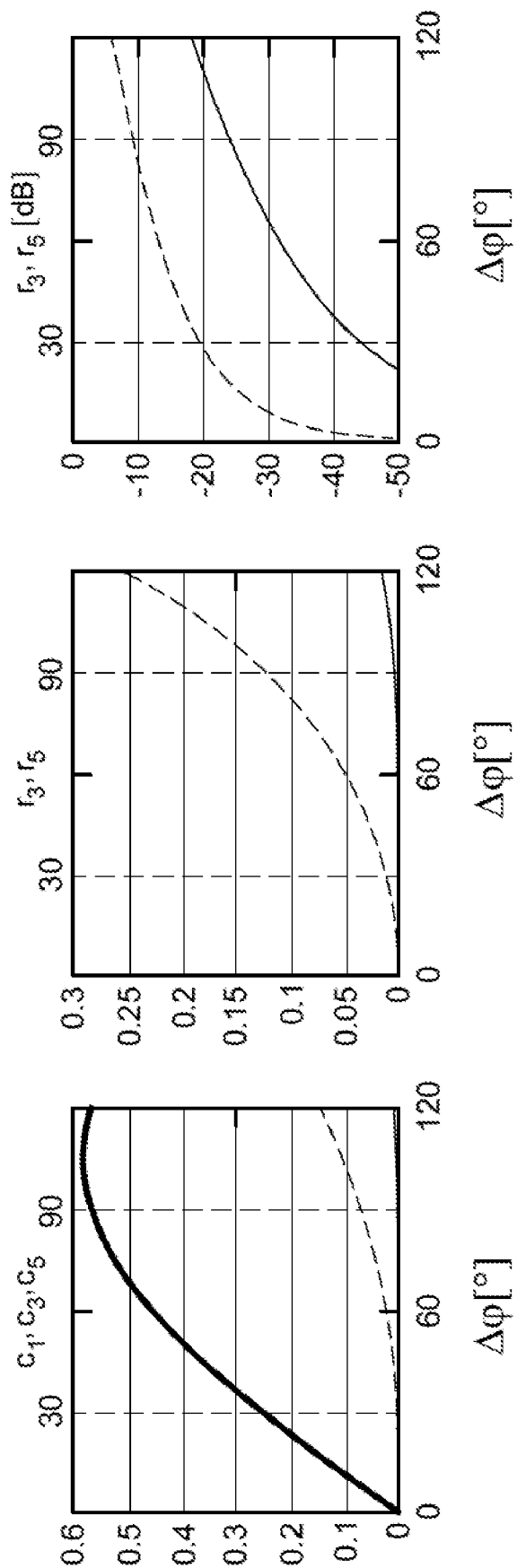
FIGS. 9A to 9C are graphs of the amplitudes $c_q$ (FIG. 9A) and relative amplitudes $r_q$ (FIGS. 9B and 9C) for q=1 (thick solid line), 3 (dashed line) and 5 (thin solid line), plotted as a function of the phase swing $\Delta\varphi$ induced by the modulation voltage applied by a DDMZ electro-optic modulator such as the one of FIG. 8.

In FIGS. 9A to 9C, there are provided graphs of the amplitudes $c_q$ (FIG. 9A) and relative amplitudes $r_q$ (FIGS. 9B and 9C) for q=1 (thick solid line), 3 (dashed line) and 5 (thin solid line), plotted as a function of the phase swing $\Delta\varphi$ induced by the modulation voltage applied by a DDMZ electro-optic modulator such as the one of FIG. 8.

Returning to FIG. 7A, in some implementations, the spectrally resolved detector unit 712 can be embodied by an optical heterodyne OSA. It is to be noted that the general principles underlying optical heterodyne detection are known in the art, and need not be covered in detail herein. Reference in this regard is made to U.S. Pat. Nos. 6,256,103 B1 and 6,515,276 B2, the disclosures of which being incorporated herein by reference in their entirety. A non-limiting example of a commercially available optical heterodyne OSA is the WaveAnalyzer™ 1500S Optical Spectrum Analyzer manufactured by Finisar.

In the illustrated embodiment, the optical heterodyne OSA 712 can generally include a local oscillator (LO) source 750, an optical coupler 752, a heterodyne receiver 754, and a sweep controller 756. The LO source 750, for example a laser source, generates an LO signal 758 having a tunable LO frequency $\nu$ and sends it toward the optical coupler 752, for example a PM fiber (PMF) coupler. In the first acquisition mode (spectral shifter 706 on), the optical coupler 752 combines the LO signal 758 and the double-sideband signal 708 into a first combined signal 760, while in the second acquisition mode (spectral shifter 706 off), the optical coupler 752 combines the LO signal 758 and the optical signal 702 into a second combined signal 762.

The heterodyne receiver 754 is configured to, in the first acquisition mode, receive the first combined signal 760 and generate therefrom the first detected signal 714, and, in the second acquisition mode, receive the second combined signal 762 and generated therefrom the second detected signal 716. The heterodyne receiver 754 can include a set of photodetectors 764, for example in a balanced detection scheme, to convert detected light signals into electrical signals, and electronic circuit 766 to further process the electrical signals before outputting them as detected signals 714, 716. For example, the electronic circuit 766 can include a bandpass electronic filter 768 followed by a square-law or power detector 770 including a lowpass filter 772.

The sweep controller 756 is coupled to the LO source 750 for sweeping, in both the first and second acquisition modes, the tunable LO frequency $\nu$ of the LO signal 758 within the spectral range of interest.

As described above, the detected signals 714, 716 can be sent to the processor 718 for determining or identifying the measured spectral correlation function $\tilde{P}(f\bullet)$ and optical power spectrum $P_{sn}(f)$, and for obtaining therefrom a solution representing the data-carrying signal power spectrum contribution $P_s(f)$ of $P_{sn}(f)$.

It should be noted that in the present embodiment, the optical section of the heterodyne OSA 712, whose function is to mix the input signal—the optical signal 702 or double-sideband signal 708 depending on the acquisition mode—with the LO signal 758, need not be provided with polarization diversity. This is because the polarization of the input signal 702, 708, which is determined by the polarizer 732 of the polarization analyzer 728, is fixed and known. Therefore, if the optical path between the polarization analyzer 728 and the optical coupler 752 of the heterodyne OSA 712 consists of PM fibers, the known polarization state of the input signal 702, 708 at the output of the polarization analyzer 728 would generally be preserved at the input of the optical coupler 752. This feature can simplify the optical section of the heterodyne OSA 712.

It should also be noted that a scanning OSA whose function is to display spectra includes an electronic or digital lowpass filter 772 at the output of the photodetectors 764, whose bandwidth is typically only a few tens of kHz or even much less if slow or low-resolution scans are acceptable. In the present embodiment, what is observed as output of the square-law or power detector 770 in the first acquisition mode is the beatnote amplitude function, from which the spectral correlation function $\tilde{P}(f\bullet)$ is to be determined. Therefore, the cutoff frequency $f_c$ of this lowpass filter 772 is preferably higher than the selected beat frequency $f_b$ which, as previously mentioned, can be expected to be around 1 MHz, for example in the range from a few hundreds of kHz to 2 MHz.

Figure 10:
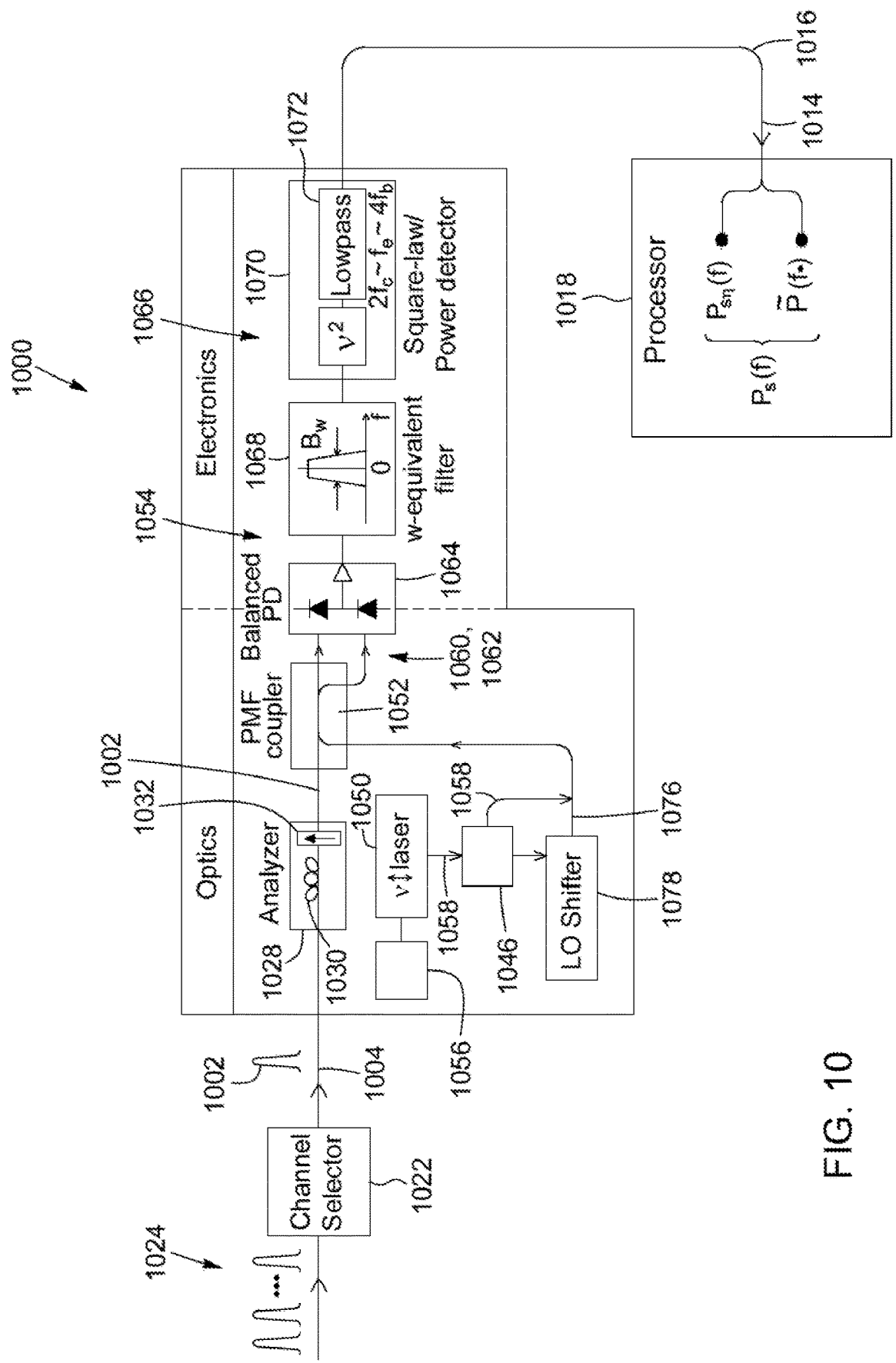
FIG. 10 is a schematic block diagram of a system for spectrally characterizing an optical signal propagating along an optical communication link, in accordance with another possible embodiment.

Referring now to FIG. 10, there is illustrated a schematic block diagram of another exemplary embodiment of a system 1000 for spectrally characterizing an optical signal 1002 propagating along an optical communication link 1004. As for the embodiment of FIGS. 7A and 7B, the spectrally resolved detector unit 1012 in the embodiment of FIG. 10 is a heterodyne OSA, but differs mainly in that, in the first acquisition mode, it is the LO signal 1058 that is converted into a double-sideband LO signal 1076 instead of the optical signal 1002. More details regarding this embodiment are provided below.

The heterodyne OSA 1012 in FIG. 10 includes an LO source 1050, for example a laser source, generating an LO signal 1058 having a tunable LO frequency ν, an LO spectral shifter 1078, an optical coupler 1052, a heterodyne receiver 1054, and a sweep controller 1056. The LO spectral shifter 1078 is configured to generate, in a first acquisition mode, a double-sideband LO signal 1076 from the LO signal 1058, the double-sideband LO signal including a first LO image signal and a second LO image signal spectrally separated from each other by a spectral shift equal to the symbol frequency $f_{sb}$ plus or minus a beatnote frequency $f_b$. As mentioned above, the beatnote frequency $f_b$ is lower than the symbol frequency $f_{sb}$. As for the spectral shifter described above, the LO spectral shifter 1078 can be embodied, for example, by a DDMZ amplitude modulator. Also, depending on the application, in the second acquisition mode, LO spectral shifter 1078 can be either bypassed by the LO signal 1058 (e.g., via an optical switch 1046) or have its spectral shifting capabilities turned off while the LO signal 1058 passes therethrough.

The optical coupler 1052 is configured to, in the first acquisition mode (LO spectral shifter 1078 on), combine the double-sideband LO signal 1076 and the optical signal 1002 into a first combined signal 1060, and, in the second acquisition mode (LO spectral shifter 1078 off), combine the LO signal 1058 and the optical signal 1002 into a second combined signal 1062. As in FIG. 7A, the optical coupler can be a PMF coupler. The heterodyne receiver 1054 is configured to, in the first acquisition mode, receive the first combined signal 1060 and generate therefrom the first detected signal 1014, and, in the second acquisition mode, receive the second combined signal 1062 and generated therefrom the second detected signal 1016. The configuration of the heterodyne receiver 1054 corresponds to that in FIG. 7A and will not be described again. The sweep controller 1056 is coupled to the LO source 1050 for sweeping, in both the first and second acquisition modes, the tunable LO frequency ν of the LO signal 1058 within the spectral range of interest.

As described above, the detected signals 1014, 1016 can be sent to the processor 1018 for determining or identifying the measured spectral correlation function $\tilde{P}(f\bullet)$ and optical power spectrum $P_{sn}(f)$, and for obtaining therefrom a solution representing the data-carrying signal power spectrum contribution $P_s(f)$ of $P_{sn}(f)$.

Figure 11:
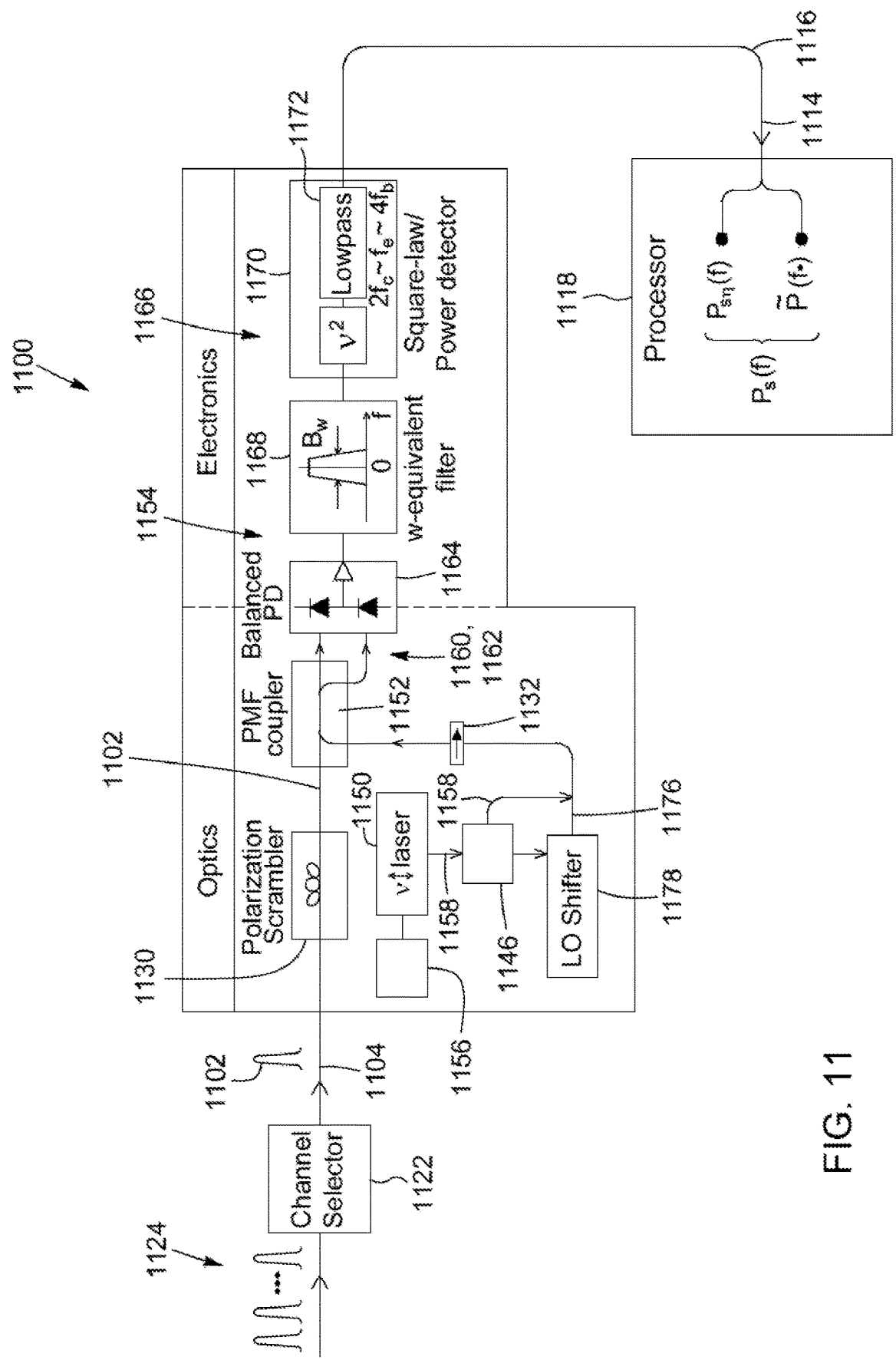
FIG. 11 is a schematic block diagram of a system for spectrally characterizing an optical signal propagating along an optical communication link, in accordance with another possible embodiment.

It is noted that compared to the embodiment of FIG. 7A, the polarizer analyzer 1028 in FIG. 10 is integrated inside the heterodyne OSA 1012, which can reduce the length of the optical path between the polarizer analyzer 1028 and the optical coupler 1052. In a variant, illustrated in FIG. 11, the optical coupler 1152 is not a PMF coupler, and no polarizer is provided after the polarization scrambler 1130. As an option in FIG. 11, a polarizer 1132 can be inserted between the LO spectral shifter 1178 and the optical coupler 1152 to ensure, or help ensure, that the polarization state of the double-sideband LO signal 1176 remains stable and known regardless of its actual polarization state at the output of the LO source 1150 and polarization state transformations induced by the LO spectral shifter 1178, if any.

In some implementations, several advantages can result from applying the double-sideband spectral shifting to the LO signal rather than to the optical signal. First, the use of a channel λ-selector may in principle be avoided and, consequently, the scans of f and f• could encompass all channels in one acquisition, since there would be no need to acquire the raw data sequentially channel by channel Second, the output of the LO spectral shifter could be used to actively lock the operating point through a feedback loop if a Mach-Zehnder modulator such as that of FIG. 8 is used. In more general terms, by applying the double-sideband spectral shifting to the LO signal, a control of the harmonics could be achieved, for example by actively setting any adjustable parameter of the LO spectral shifter to both reduce and stabilize undesirable harmonics.

Figure 12:
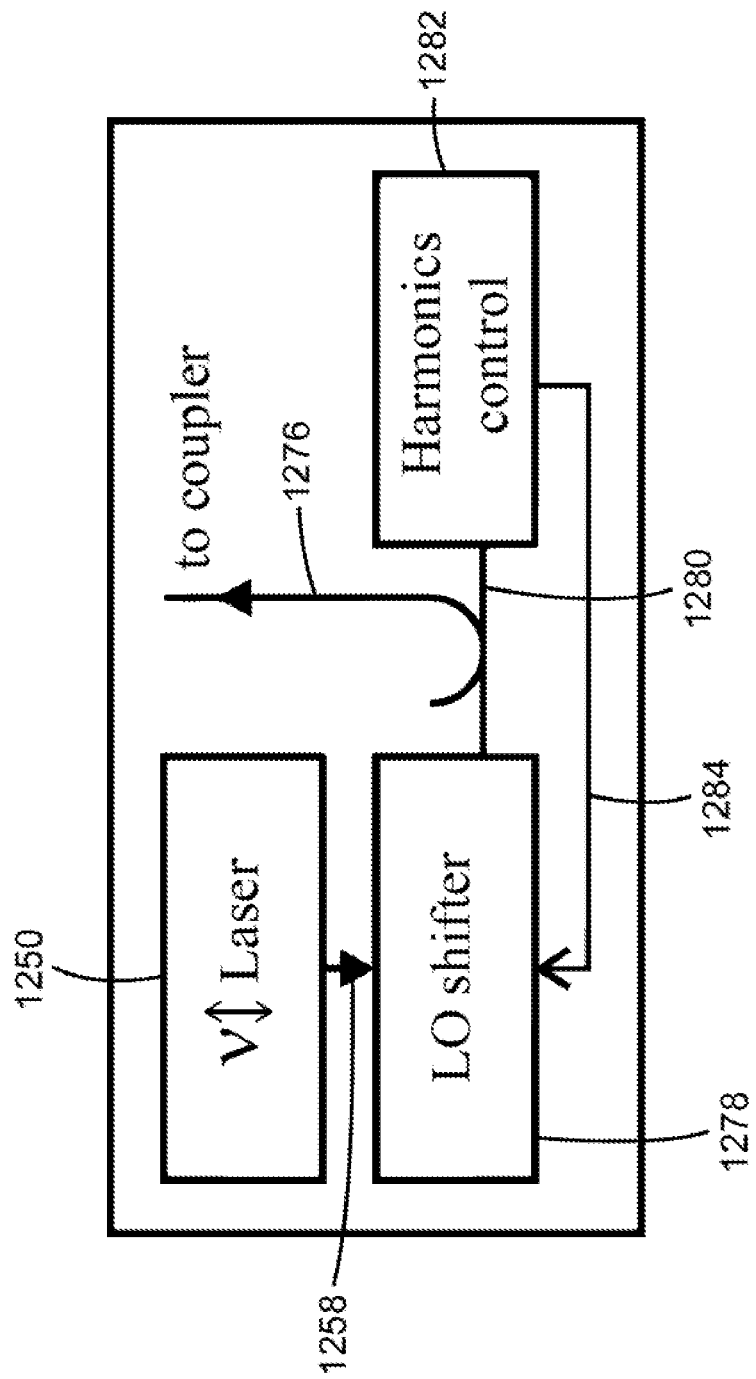
FIG. 12 is a schematic representation of a block diagram illustrating the concept of harmonics control that can be used in some embodiments of the present techniques.

In embodiments such as FIG. 10, since the double-sideband LO signal 1076 is accessible, it may be possible, at least in principle, to actively lock the operating parameters of the LO spectral shifter 1078 through a feedback loop. As mentioned above, the double-sideband LO signal 1076 is, in the first acquisition mode, the LO signal to be mixed with the signal under test in the heterodyne detection technique. Therefore, based on the observed spectrum, operating parameters can be actively adjusted such that undesirable harmonics are both reduced and stabilized. The general concept is illustrated in FIG. 12, which shows that a portion 1280 of the double-sideband LO signal 1276 is extracted and sent to a harmonics control unit 1282, which can in turn dynamically adjust the operation of the LO spectral shifter 1278 through a feedback loop 1284. It will be understood that the actual operating parameters of the harmonics control unit 1282 and the nature and number of the harmonics can be controlled—and to what degree—depend on the specific implementation of the LO spectral shifter 1278.

Figure 13:
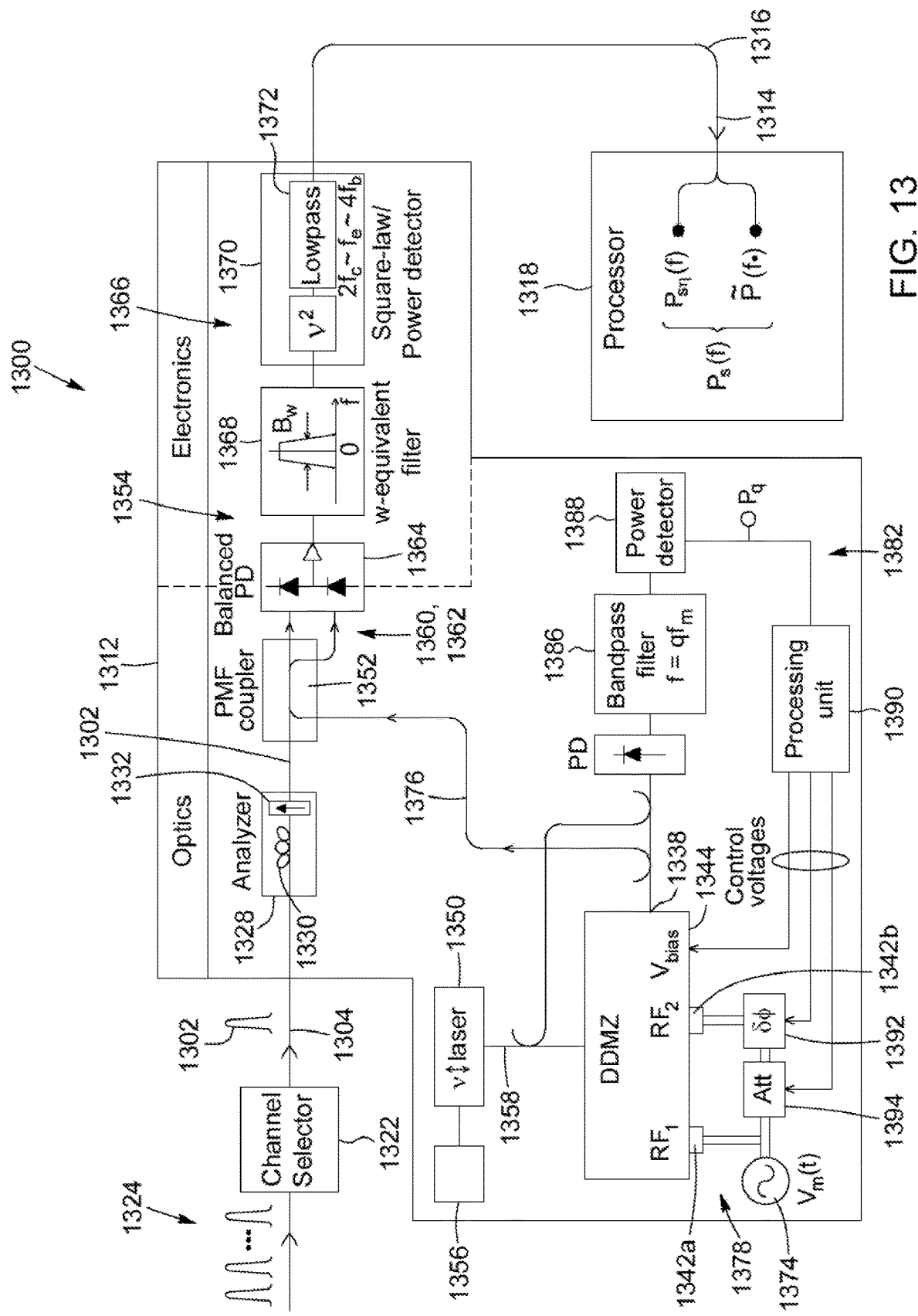
FIG. 13 is a schematic representation of a system for spectrally characterizing an optical signal propagating along an optical communication link, in accordance with another possible embodiment, the system including harmonics control capabilities.

Referring now to FIG. 13, an example of an embodiment of a system 1300 including harmonics control capabilities is illustrated. In this embodiment, the LO spectral shifter 1378 is embodied by a DDMZ modulator. As mentioned in the description pertaining to FIG. 8, the presence of odd harmonics in the spectrum of the double-sideband LO signal 1376 may be difficult to avoid in such implementations. However, in contrast, even harmonics (q=0, 2, . . . ) can be suppressed, or at least significantly reduced, if the operating parameters of the DDMZ LO spectral shifter 1378 are appropriately set, as discussed above. In some implementations, these operating parameters are (i) the combined input-splitting and output-coupling ratio of the interferometer, (ii) the amplitude ratio and (iii) phase difference of the sinusoidal voltages applied to the first and second RF inputs 1342a, 1342b ($RF_1$ and $RF_2$), and (iv) the bias voltage at the bias input 1344. Then, even harmonics are suppressed or at least attenuated to a sufficient degree if the following conditions are satisfied:

1. The two lightwaves that are combined at the output 1338 of the DDMZ LO spectral shifter 1378, the first lightwave coming from the first arm and the second lightwave coming from second arm, have the same amplitude. (The arms are not shown in FIG. 13; see, e.g., FIG. 8).
2. The sinusoidal phase-modulations induced by the first and second arms have equal phase-swings. This condition can be set by adjusting the power ratio of the sinusoidal voltages applied to the first and second RF inputs 1342a, 1342b.

3. The sinusoidal phase-modulations induced by the first and second arms are out of phase (i.e., phase difference=$\pi$). This condition can be set by adjusting the phase difference between the sinusoidal voltages applied to the first and second RF inputs 1342a, 1342b.
4. The bias voltage at bias input 1344 is set such that, when both RF inputs 1342a, 1342b are zero, the difference ($\varphi_2-\varphi_1$) between the phase shifts induced by the first and second arms is ($\varphi_2-\varphi_1$)=$\pi$, since in this situation the amplitude of the output lightwave is zero.

In some implementations, under the assumption that condition 1 is satisfied from careful manufacturing of the DDMZ LO spectral shifter 1378, the remaining conditions can be met by finely setting the parameters mentioned in conditions 2 to 4, based on the power of harmonic q=2 in the spectrum of the 2-$\nu$-shifted lightwave.

Referring still to FIG. 13, an example of possible implementation of a harmonics control unit 1382 will be described. A bandpass filter 1386 centered at f=q·$f_m$ selects harmonic q, whose power $P_q$ is measured by a power detector 1388. With q=2, a processing unit 1390 connected to the power detector 1388 is configured to search the values of the parameters $v_{bias}$ $v_{\delta\varphi}$ $v_{att}$ in the set $v_{hc}=(v_{bias}\ v_{\delta\varphi} v_{att})$ until the set of values that minimizes or otherwise optimizes a specified condition with respect to $P_q$ is found, where $v_{bias}$ is the bias voltage, and $v_{\delta\varphi}$ and $v_{att}$ are respectively the control voltage of the RF phase-shifter 1392 ($\delta\varphi$) and attenuator 1394 (Att) associated with the DDMZ LO spectral shifter 1378. Depending on the application, this optimization procedure may be performed during manufacturing, or occasionally or periodically during the operation phase of the system 1300, for example every time the instrument is powered on or before every measurement, depending on the stability over time of the optimization procedure.

Figure 14:
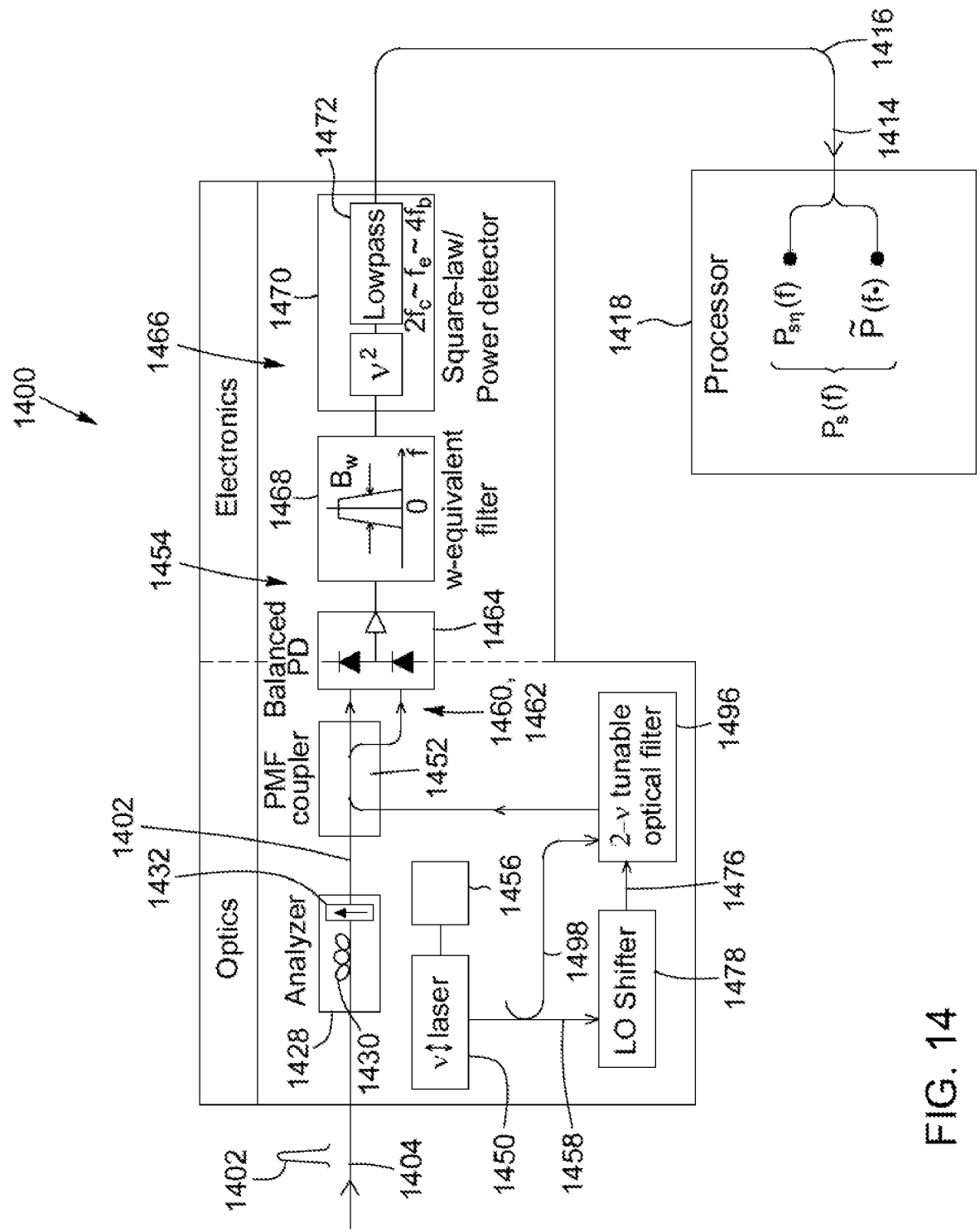
FIG. 14 is a schematic representation of a system for spectrally characterizing an optical signal propagating along an optical communication link, in accordance with another possible embodiment, the system including a tunable optical filter for harmonics filtering.

In some implementations, undesirable harmonics in the spectrum of the 2-$\nu$-shifted laser lightwave may be suppressed or at least significantly reduced by filtering them out using a tunable 2-$\nu$ optical filter, which can be a tunable optical filter having two narrow (i.e., $\ll f_m$) passbands centered at $v_{\pm}=(v\pm f_m)$, where $\nu$ is the optical frequency of the tunable laser. Referring to FIG. 14, there is depicted an example of such an implementation, where a tunable 2-$\nu$ optical filter 1496 receives and filters undesirable harmonics out of the double-sideband LO signal 1476 prior to it being mixed with the optical signal under test 1402. In operation, the two passband-frequencies $v_{\pm}=(v\pm f_m)$ of the tunable 2-$\nu$ optical filter 1496 can be continuously varied to follow the optical frequency $\nu$ of the tunable LO source 1450 as it is changed for scanning the spectrum, or be locked in some way. In some implementations, an active lock may be performed, in which case it may be useful to provide a sample 1498 of the LO signal 1458 (i.e., before the LO spectral shifter 1478) to the control box of the 2-$\nu$ tunable optical filter 1496, as depicted in FIG. 14.

According to another aspect, there is provided a non-transitory computer readable storage medium having stored thereon computer readable instructions that, when executed by a processor, cause the processor to perform a method for spectrally characterizing an optical signal propagating along an optical communication link, such as disclosed herein.

In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memories, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

In some implementations, the computer program stored in the computer readable storage medium can instruct a processor to perform the following steps: receiving a measured optical power spectrum of the optical signal over a spectral range within the data-carrying signal bandwidth, the measured optical power spectrum including a data-carrying signal power spectrum contribution associated with the data-carrying signal contribution of the optical signal and a noise power spectrum contribution associated with the noise contribution of the optical signal; receiving a measured spectral correlation function for a set of pairs of spectral components of the optical signal, the spectral components in each pair being spectrally separated from each other by the symbol frequency, the set of pairs being respectively centered on a corresponding set of center frequencies over a center frequency range within the spectral range, the measured spectral correlation function relating a correlation intensity between the spectral components of each pair to the center frequency of the pair over the center frequency range; and obtaining a solution representing the data-carrying signal power spectrum contribution based on the measured optical power spectrum of the optical signal, such that a calculated spectral correlation function for pairs of spectral components spectrally separated by the symbol frequency in the solution representing the data-carrying signal power spectrum contribution matches the measured spectral correlation function.

In some implementations, the step of obtaining the data carrying signal power spectrum contribution can include determining a solution representing the noise power spectrum contribution, and deriving the solution representing the data-carrying signal power spectrum contribution from the solution representing the noise power spectrum contribution and the measured optical power spectrum.

In some implementations, the step of obtaining the solution representing the data-carrying signal power spectrum contribution can include providing a nonlinear regression model relating the measured optical power spectrum and the measured spectral correlation function, and using the nonlinear regression model to determine the solution representing the data-carrying signal power spectrum contribution. In some implementations, the nonlinear regression model can include a set of adjustable parameters, such as: a model function representing a normalized model of the noise power spectrum contribution; a noise-to-signal ratio parameter representative of a relative amplitude of the noise power spectrum contribution with respect to the data-carrying signal power spectrum contribution; and a dispersion parameter conveying information indicative of chromatic dispersion and/or polarization mode dispersion of the optical signal.

In some implementations, the method can further include a step of determining an optical signal-to-noise ratio (OSNR) based on the measured optical power spectrum and the solution representing the data-carrying signal power spectrum contribution.

It will be understood that the methods and systems described herein can find applications in maintenance, monitoring and/or troubleshooting.

Although the above description refers to portable test instruments (such as portable OSAs), it should be mentioned that some signal characterization methods described herein may be used for monitoring applications which employ fixed (as opposed to portable) test instruments.

It should be noted that all the equations provided herein as a function of frequency, could be adapted to be expressed as a function of wavelength, wave number, or the like. Accordingly, all the equations given herein could be readily adapted to find their equivalent as a function of the wavelength or wave number.

It should be appreciated that the methods described above are not limited to the characterization of an optical signal having a unique signal carrier wavelength. The optical signal under test may include a plurality of data-carrying signal contributions multiplexed using Nyquist wavelength division multiplexing (N-WDM) (also referred to as "superchannels" in the scientific literature), such as dual-carrier PM-16-QAM (which is currently deployed for 400 G transmission) or all-optical orthogonal frequency-division multiplexing (OFDM), for example, provided that the variation of the signal portion of such an optical signal under test is significantly greater than the ASE-noise variation across at least a portion of the optical signal bandwidth.

Of course, numerous modifications could be made to the embodiments described above without departing from the scope of the appended claims.

The invention claimed is:

1. A method for spectrally characterizing an optical signal propagating along an optical communication link, said optical signal comprising a data-carrying signal contribution modulated at a symbol frequency within a data-carrying signal bandwidth and a noise contribution, said method comprising:
    measuring an optical power spectrum of said optical signal over a spectral range within said data-carrying signal bandwidth, said measured optical power spectrum comprising a data-carrying signal power spectrum contribution associated with said data-carrying signal contribution of said optical signal and a noise power spectrum contribution associated with said noise contribution of said optical signal;
    determining, from measurement, a spectral correlation function for a set of pairs of spectral components of said optical signal, the spectral components in each pair being spectrally separated from each other by said symbol frequency, said set of pairs being respectively centered on a corresponding set of center frequencies over a center frequency range within said spectral range, said measured spectral correlation function relating a correlation intensity between the spectral components of each pair to the center frequency of the pair over said center frequency range; and
    obtaining, using a processor, a solution representing said data-carrying signal power spectrum contribution based on said measured optical power spectrum of said optical signal, such that a calculated spectral correlation function for pairs of spectral components spectrally separated by said symbol frequency in said solution representing said data-carrying signal power spectrum contribution matches said measured spectral correlation function,
    wherein obtaining said solution representing said data-carrying signal power spectrum contribution comprises:
        providing a nonlinear regression model relating said measured optical power spectrum and said measured spectral correlation function; and
        using said nonlinear regression model to determine said solution representing said data-carrying signal power spectrum contribution.

2. The method of claim 1, wherein obtaining said solution representing said data carrying signal power spectrum contribution comprises:
    determining a solution representing said noise power spectrum contribution; and
    deriving said solution representing said data-carrying signal power spectrum contribution from said solution representing said noise power spectrum contribution and said measured optical power spectrum.

3. The method of claim 1, wherein said nonlinear regression model comprises a set of adjustable parameters, said adjustable parameters comprising at least one of:
    a model function representing a normalized model of said noise power spectrum contribution;
    a noise-to-signal ratio parameter representative of a relative amplitude of said noise power spectrum contribution with respect to said data-carrying signal power spectrum contribution; and
    a dispersion parameter conveying information indicative of at least one of a chromatic dispersion and a polarization mode dispersion of said optical signal.

4. The method of claim 1, further comprising determining an optical signal-to-noise ratio (OSNR) based on said measured optical power spectrum and said solution representing said data-carrying signal power spectrum contribution.

5. The method of claim 1, further comprising averaging said measured optical power spectrum and said measured spectral correlation function over a plurality of polarization states of said optical signal.

6. The method of claim 1, wherein determining, from measurement, said measured spectral correlation function comprises measuring a beatnote amplitude function for a set of pairs of beating components respectively associated with said set of pairs of spectral components spectrally separated by said symbol frequency in said optical signal, the beating components in each pair being spectrally separated from each other by a beatnote frequency lower than said symbol frequency, said beatnote amplitude function representing said measured spectral correlation function.

7. The method of claim 6, wherein a ratio of said symbol frequency to said beatnote frequency ranges from $10^3$ to $10^6$.

8. The method of claim 6, wherein measuring said beatnote amplitude function comprises:
    generating, from said optical signal, a double-sideband signal comprising a first image signal and a second image signal, said first and second image signals representing sideband images of said optical signal, said first and second image signals being spectrally separated from each other by a spectral shift equal to said symbol frequency plus or minus said beatnote frequency;
    detecting and spectrally resolving said double-sideband signal within said spectral range; and
    determining, from said detected double-sideband signal, said beatnote amplitude function for said set of pairs of beating components, wherein one beating component of each pair is associated with said first image signal and the other beating component is associated with said second image signal.

9. The method of claim 8, wherein detecting and spectrally resolving said double-sideband signal further comprises:
generating a local oscillator (LO) signal having a tunable LO frequency;
combining said LO signal and said double-sideband signal into a combined signal; and
detecting said combined signal while sweeping said tunable LO frequency within said spectral range.

10. The method of claim 6, wherein measuring said beatnote amplitude function comprises:
generating a local oscillator (LO) signal having a tunable LO frequency within said spectral range;
generating, from said LO signal, a double-sideband LO signal comprising a first LO image signal and a second LO image signal, said first and second LO image signals representing sideband images of said LO signal, said first and second LO image signals being spectrally separated from each other by a spectral shift equal to said symbol frequency plus or minus a beatnote frequency, said beatnote frequency being lower than said symbol frequency;
combining said double-sideband LO signal and said optical signal into a combined signal;
detecting and spectrally resolving said combined signal within said spectral range, while sweeping said tunable LO frequency; and
determining, from said detected combined signal, said beatnote amplitude function for said set of pairs of beating components, wherein one beating component of each pair is associated with said first LO image signal and the other beating component is associated with said second LO image signal.

11. The method of claim 10, further comprising reducing harmonics in said double-sideband LO signal.

12. The method of claim 1, wherein said measured optical power spectrum and said measured spectral correlation function are obtained using a heterodyne optical spectrum analyzer.

13. A non-transitory computer readable storage medium having stored thereon computer readable instructions that, when executed by a processor, cause said processor to perform a method for spectrally characterizing an optical signal propagating along an optical communication link, said optical signal comprising a data-carrying signal contribution modulated at a symbol frequency within a data-carrying signal bandwidth and a noise contribution, said method comprising:
receiving a measured optical power spectrum of said optical signal over a spectral range within said data-carrying signal bandwidth, said measured optical power spectrum comprising a data-carrying signal power spectrum contribution associated with said data-carrying signal contribution of said optical signal and a noise power spectrum contribution associated with said noise contribution of said optical signal;
receiving a measured spectral correlation function for a set of pairs of spectral components of said optical signal, the spectral components in each pair being spectrally separated from each other by said symbol frequency, said set of pairs being respectively centered on a corresponding set of center frequencies over a center frequency range within said spectral range, said measured spectral correlation function relating a correlation intensity between the spectral components of each pair to the center frequency of the pair over said center frequency range; and
obtaining a solution representing said data-carrying signal power spectrum contribution based on said measured optical power spectrum of said optical signal, such that a calculated spectral correlation function for pairs of spectral components spectrally separated by said symbol frequency in said solution representing said data-carrying signal power spectrum contribution matches said measured spectral correlation function;
wherein obtaining said solution representing said data-carrying signal power spectrum contribution comprises:
providing a nonlinear regression model relating said measured optical power spectrum and said measured spectral correlation function; and
using said nonlinear regression model to determine said solution representing said data-carrying signal power spectrum contribution.

14. The non-transitory computer readable storage medium of claim 13, wherein obtaining said solution representing said data carrying signal power spectrum contribution comprises:
determining a solution representing said noise power spectrum contribution; and
deriving said solution representing said data-carrying signal power spectrum contribution from said solution representing said noise power spectrum contribution and said measured optical power spectrum.

15. The non-transitory computer readable storage medium of claim 13, wherein said nonlinear regression model comprises a set of adjustable parameters, said adjustable parameters comprising at least one of:
a model function representing a normalized model of said noise power spectrum contribution;
a noise-to-signal ratio parameter representative of a relative amplitude of a said noise power spectrum contribution with respect to said data-carrying signal power spectrum contribution; and
a dispersion parameter conveying information indicative of at least one of a chromatic dispersion and a polarization mode dispersion of said optical signal.

16. The non-transitory computer readable storage medium of claim 13, wherein the method further comprises determining an optical signal-to-noise ratio (OSNR) based on said measured optical power spectrum and said solution representing said data-carrying signal power spectrum contribution.

17. A system for spectrally characterizing an optical signal propagating along an optical communication link, said optical signal comprising a data-carrying signal contribution modulated at a symbol frequency within a data-carrying signal bandwidth and a noise contribution, said system comprising:
a spectral shifter configured to generate, in a first acquisition mode, a double-sideband signal from said optical signal, said double-sideband signal comprising a first image signal and a second image signal spectrally separated from each other by a spectral shift equal to said symbol frequency plus or minus a beatnote frequency, said beatnote frequency being lower than said symbol frequency;
a spectrally resolved detector unit operable within a spectral range in said data-carrying signal bandwidth, the spectrally resolved detector unit being configured to detect said double-sideband signal in said first acquisition mode and output a first detected signal, and to detect said optical signal in a second acquisition mode and output a second detected signal; and a processor coupled to said spectrally resolved detector unit and configured to:

determine or identify a measured optical power spectrum of said optical signal based on said second detected signal, said measured optical power spectrum comprising a data-carrying signal power spectrum contribution associated with said data-carrying signal contribution of said optical signal and a noise power spectrum contribution associated with said noise contribution of said optical signal;

determine a spectral correlation function within pairs of spectral components of said optical signal, the spectral components in each pair being spectrally separated from each other by said symbol frequency, said spectral correlation function being determined by determining, based on said first detected signal, a beatnote amplitude function within pairs of beating components respectively associated with said pairs of spectral components, the beating components in each pair being spectrally separated from each other by said beatnote frequency, one associated with said first image signal and the other associated with said second image signal; and obtaining a solution representing said data-carrying signal power spectrum contribution based on said measured optical power spectrum of said optical signal, such that a calculated spectral correlation function for pairs of spectral components spectrally separated by said symbol frequency in said solution representing said data-carrying signal power spectrum contribution matches said measured spectral correlation function;

wherein obtaining said solution representing said data-carrying signal power spectrum contribution comprises:

providing a nonlinear regression model relating said measured optical power spectrum and said measured spectral correlation function; and using said nonlinear regression model to determine said solution representing said data-carrying signal power spectrum contribution.

18. The system of claim 17, wherein said spectrally resolved detector unit further comprises:

a local oscillator (LO) source generating an LO signal having a tunable LO frequency;

an optical coupler for, in said first acquisition mode, combining said LO signal and said double-sideband signal into a first combined signal, and, in said second acquisition mode, combining said LO signal and said optical signal into a second combined signal;

a heterodyne receiver for, in said first acquisition mode, receiving said first combined signal and generating therefrom said first detected signal, and, in said second acquisition mode, receiving said second combined signal and generating therefrom said second detected signal; and a sweep controller coupled to said LO source for sweeping said tunable LO frequency within said spectral range in said first and second acquisition modes.

19. The system of claim 17, wherein said spectral shifter is an electro-optical modulator.

20. The system of claim 17, further comprising a polarization analyzer disposed upstream of said spectrally resolved detector unit, said polarization analyzer comprising:

a polarization scrambler configured to vary a polarization state of said optical signal or said double-sideband signal as a function of time; and a polarizer configured to pass a fixed polarization component of said optical signal or said double-sideband signal in the varied polarization state.

21. The system of claim 17, further comprising an optical channel selector configured to select said optical signal from a selected one a plurality of spaced-apart optical channels.

22. A system for spectrally characterizing an optical signal propagating along an optical communication link, said optical signal comprising a data-carrying signal contribution modulated at a symbol frequency within a data-carrying signal bandwidth and a noise contribution, the system comprising:

a spectrally resolved detector unit operable within a spectral range in said data-carrying signal bandwidth, the spectrally resolved detector unit comprising:

a local oscillator (LO) source generating an LO signal having a tunable LO frequency;

an LO spectral shifter configured to generate, in a first acquisition mode, a double-sideband LO signal from the LO signal, the double-sideband LO signal comprising a first LO image signal and a second LO image signal spectrally separated from each other by a spectral shift equal to said symbol frequency plus or minus a beatnote frequency, said beatnote frequency being lower than said symbol frequency;

an optical coupler for, in said first acquisition mode, combining said double-sideband LO signal and said optical signal into a first combined signal, and, in said second acquisition mode, combining said LO signal and said optical signal into a second combined signal;

a heterodyne receiver for, in said first acquisition mode, receiving said first combined signal and generating therefrom a first detected signal, and, in said second acquisition mode, receiving said second combined signal and generating therefrom a second detected signal; and a sweep controller coupled to said LO source for sweeping said tunable LO frequency within said spectral range in said first and second acquisition modes; and a processor coupled to the spectrally resolved detector unit and configured to:

determine or identify a measured optical power spectrum of said optical signal based on said second detected signal, said measured optical power spectrum comprising a data-carrying signal power spectrum contribution associated with said data-carrying signal contribution of said optical signal and a noise power spectrum contribution associated with said noise contribution of said optical signal;

determine a spectral correlation function within pairs of spectral components of said optical signal, the spectral components in each pair being spectrally separated from each other by said symbol frequency, said spectral correlation function being determined by determining, based on said first detected signal, a beatnote amplitude function within pairs of beating components respectively associated with said pairs of spectral components, the beating components in each pair being spectrally separated from each other by said beatnote frequency, one associated with said first LO image signal and the other associated with said second LO image signal; and obtain a solution representing said data-carrying signal power spectrum contribution based on said measured optical power spectrum of said optical signal, such that a calculated spectral correlation function for pairs of spectral components spectrally separated by said symbol frequency in said solution representing said data-carrying signal power spectrum contribution matches said measured spectral correlation function;

wherein obtain said solution representing said data-carrying signal power spectrum contribution comprises:

providing a nonlinear regression model relating said measured optical power spectrum and said measured spectral correlation function; and using said nonlinear regression model to determine said solution representing said data-carrying signal power spectrum contribution.

23. The system of claim 22, wherein said LO spectral shifter is an electro-optical modulator.

24. The system of claim 22, further comprising a polarization analyzer disposed upstream of said spectrally resolved detector unit, the polarization analyzer comprising:

a polarization scrambler configured to vary a polarization state of said optical signal as a function of time; and a polarizer configured to pass a fixed polarization component of said optical signal having the varied polarization state.

* * * * *